(12) United States Patent
François et al.

(10) Patent No.: US 9,998,663 B1
(45) Date of Patent: Jun. 12, 2018

(54) SURROUND IMAGE CAPTURE AND PROCESSING

(71) Applicant: Car360 Inc., Atlanta, GA (US)

(72) Inventors: Bruno François, Atlanta, GA (US); Grant Schindler, Atlanta, GA (US)

(73) Assignee: Car360 Inc., Atlanta, GA (US)

( * ) Notice: Subject to any disclaimer, the term of this patent is extended or adjusted under 35 U.S.C. 154(b) by 156 days.

(21) Appl. No.: 14/947,842

(22) Filed: Nov. 20, 2015

Related U.S. Application Data

(60) Provisional application No. 62/100,546, filed on Jan. 7, 2015.

(51) Int. Cl.
*H04N 5/232* (2006.01)
*G06T 7/00* (2017.01)
*H04N 5/262* (2006.01)

(52) U.S. Cl.
CPC ....... *H04N 5/23238* (2013.01); *G06T 7/0042* (2013.01); *H04N 5/23267* (2013.01); *H04N 5/2628* (2013.01)

(58) Field of Classification Search
CPC ............. H04N 5/2628; H04N 5/23267; H04N 5/23258; H04N 5/23238; G06T 7/80; G06T 7/00
See application file for complete search history.

(56) References Cited

U.S. PATENT DOCUMENTS

| | | | |
|---|---|---|---|
| 5,694,533 A | 12/1997 | Richards | |
| 5,973,733 A | 10/1999 | Gove | |
| 7,119,837 B2 | 10/2006 | Soupliotis et al. | |
| 7,149,345 B2 | 12/2006 | Fujiwara | |
| 7,272,255 B2 | 9/2007 | Ishiyama | |
| 7,394,977 B2 | 7/2008 | Park et al. | |
| 7,433,497 B2 | 10/2008 | Chen | |
| 7,548,236 B2 | 6/2009 | Ikezawa | |
| 7,548,659 B2 | 6/2009 | Ofek et al. | |
| 7,557,832 B2 | 7/2009 | Lindenstruth et al. | |
| 7,558,405 B2 | 7/2009 | Tico et al. | |
| 7,605,845 B2 | 10/2009 | Batur | |
| 7,705,885 B2 | 4/2010 | Prieto et al. | |
| 7,817,181 B2 | 10/2010 | Lee | |
| 8,054,335 B2 | 11/2011 | Deng et al. | |
| 8,072,496 B2 | 12/2011 | Antsfeld | |
| 8,134,603 B2 | 3/2012 | Auberger et al. | |
| 8,194,141 B2 | 6/2012 | Narasimha et al. | |
| 8,385,732 B2 | 2/2013 | Zuniga et al. | |

(Continued)

*Primary Examiner* — Behrooz Senfi

(74) *Attorney, Agent, or Firm* — Cesari & Reed, LLP; R. Michael Reed

(57) ABSTRACT

Systems and methods are provided to perform surround image capture and processing. A camera device may use physical position and orientation sensors to determine the camera device's position along a circular path. The camera device may capture images from positions along the circular path and combine the images into a surround image animation of a central point within the circular path. The camera device may determine feature points within the image frames, and determine a smooth path or track for corresponding feature points to follow from one image to the next. The images can be combined into a smoothly animated 360-degree surround animation, which may be continually rotated without a set beginning or ending point to the animation.

21 Claims, 11 Drawing Sheets

(56) References Cited

U.S. PATENT DOCUMENTS

| | | |
|---|---|---|
| 8,488,010 B2 | 7/2013 | Voss et al. |
| 8,494,058 B2 | 7/2013 | Chang et al. |
| 8,508,605 B2 | 8/2013 | Dolgin et al. |
| 8,520,084 B2 | 8/2013 | Tsai et al. |
| 8,531,535 B2 | 9/2013 | Kwatra |
| 8,553,096 B2 | 10/2013 | Proca et al. |
| 8,558,903 B2 | 10/2013 | Wu et al. |
| 8,648,919 B2 | 2/2014 | Mantzel et al. |
| 8,743,222 B2 | 6/2014 | Hamalainen |
| 8,773,542 B2 | 7/2014 | Jiang et al. |
| 8,797,414 B2 | 8/2014 | Park et al. |
| 8,872,927 B2 | 10/2014 | Proca et al. |
| 8,890,962 B2 | 11/2014 | Proca et al. |
| 8,896,713 B2 | 11/2014 | Corey et al. |
| 8,923,400 B1 | 12/2014 | Alvarez et al. |
| 8,941,743 B2 | 1/2015 | Petrescu |
| 8,947,546 B2 | 2/2015 | Foster et al. |
| 9,300,871 B2 | 3/2016 | Zhou et al. |
| 9,300,873 B2 | 3/2016 | Zhou et al. |
| 9,525,821 B2 | 12/2016 | Chang |
| 9,596,411 B2 | 3/2017 | Thivent |
| 2007/0076982 A1 | 4/2007 | Petrescu |
| 2007/0171987 A1 | 7/2007 | Trimeche |
| 2007/0248167 A1 | 10/2007 | Park et al. |
| 2008/0143840 A1 | 6/2008 | Corkum et al. |
| 2008/0165280 A1 | 7/2008 | Deever et al. |
| 2009/0066800 A1 | 3/2009 | Wei |
| 2010/0046624 A1 | 2/2010 | Archibald et al. |
| 2010/0208086 A1 | 8/2010 | Kothandaraman et al. |
| 2013/0033612 A1 | 2/2013 | Wu et al. |
| 2013/0307937 A1 | 11/2013 | Kim |
| 2013/0335409 A1 | 12/2013 | Yamamoto |
| 2014/0198852 A1 | 7/2014 | Incesu et al. |
| 2015/0022677 A1 | 1/2015 | Guo et al. |
| 2016/0028967 A1* | 1/2016 | Sezer ............... H04N 5/2628 348/240.2 |
| 2016/0088287 A1* | 3/2016 | Sadi ................. H04N 19/54 348/43 |
| 2016/0127641 A1* | 5/2016 | Gove ................ G06T 1/0007 348/143 |
| 2016/0328827 A1* | 11/2016 | Ilic ................... H04N 5/2624 |

\* cited by examiner

SURROUND IMAGE CAPTURE AND PROCESSING

CROSS-REFERENCE TO RELATED APPLICATION(S)

The present disclosure claims priority to U.S. Provisional Patent Application No. 62/100,546 filed on Jan. 7, 2015 and entitled "A Method for Creating Smoothly Rotating 360 Degree Visualizations of Cars by Capturing Images on a Mobile Device Equipped with Inertial Sensors," which is incorporated herein by reference in its entirety.

FIELD

The present disclosure generally relates to image capture and image processing, and more particularly to image capture and processing to produce a surround image, such as a 360 degree image of an object.

BACKGROUND

Capturing a 360 degree panoramic image of an object can be difficult and expensive. Combining captured images into a smooth image without equipment such as cameras mounted to a rail extending around an object, or a fixed camera directed at an object on a rotating table, can present great difficulties.

SUMMARY

In some embodiments, an apparatus may include a camera device including a positional sensor to detect positional data regarding the camera device. The apparatus may further include a camera element to capture image data and a processor circuit configured to direct the camera element to capture the image data based on the positional data from the positional sensor.

In another embodiment, a processor-readable device may embody instructions that, when executed, may cause a processor to determine one or more feature points in selected images of a sequence of images. The device may further include instructions that cause the processor to track selected points of the one or more feature points in a first selected image to a second selected image in a sequence, selectively align feature points of an intermediate image between the first selected image and the second selected image in the sequence, and iteratively track and selectively align through the sequence of images to produce a surround image, which may be stored in a memory.

DETAILED DESCRIPTION

Figure 1:
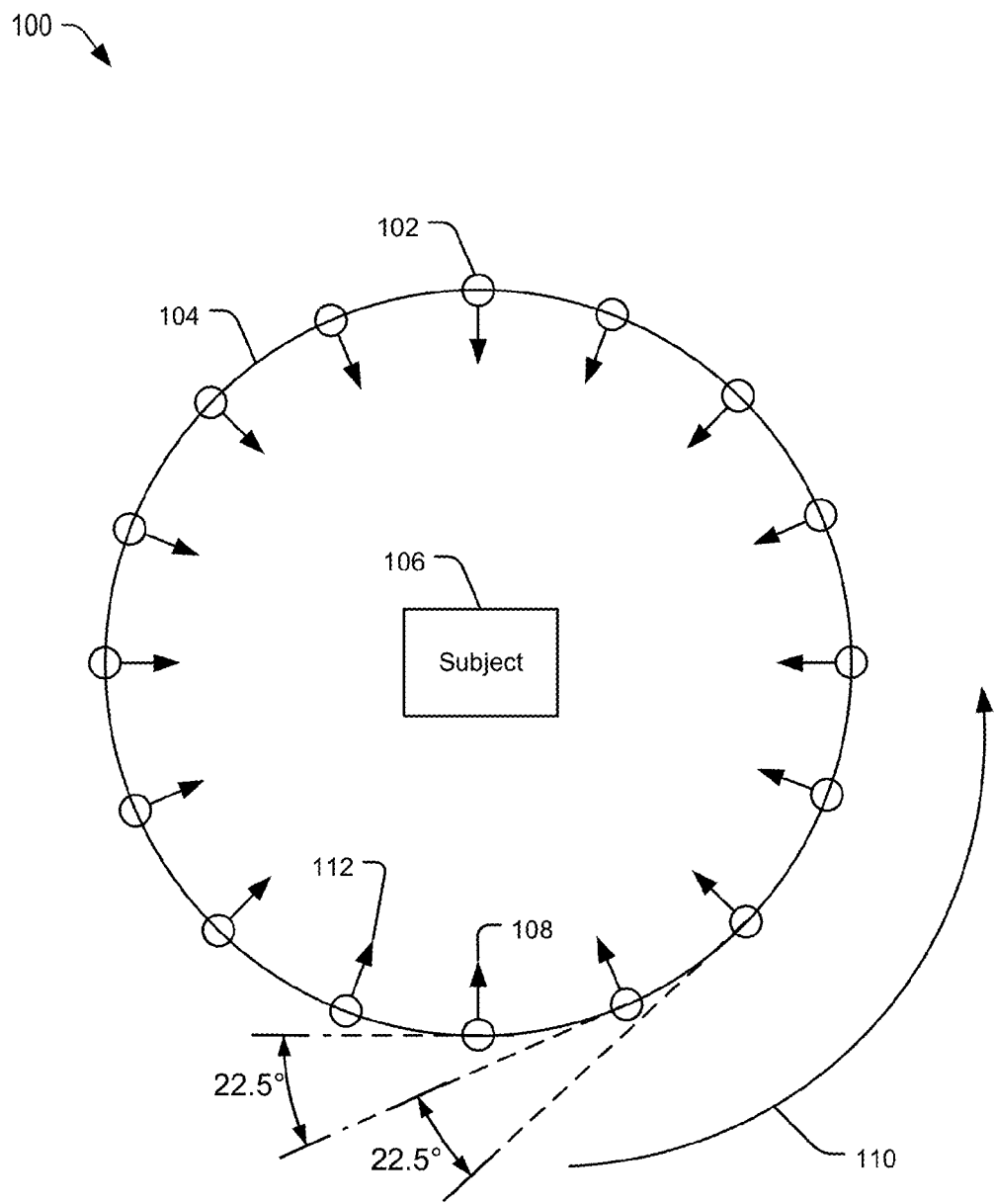
FIG. 1 depicts a block diagram of a system configured to perform surround image capture and processing, in accordance with certain embodiments of the present disclosure.

In the following detailed description of the embodiments, reference is made to the accompanying drawings which form a part hereof, and in which are shown by way of illustrations. Further, features of the various described embodiments may be combined, other embodiments may be utilized, and structural changes may be made without departing from the scope of the present disclosure.

In accordance with various embodiments, the methods and functions described herein may be implemented as one or more software programs running on a computer processor or controller circuit. In accordance with various embodiments, the methods and functions described herein may be implemented as one or more software programs executing on a computing device, such as a tablet computer, a smart phone, a personal computer, a server, or any other computing device. Alternatively, the methods and functions may be performed using dedicated hardware implementations including, but not limited to, application specific integrated circuits, programmable logic arrays, and other hardware devices. Further, the methods described herein may be implemented as a memory device, such as a nonvolatile computer readable storage device (such as a hard disc drive, a flash memory device, a compact disc, or other non-volatile storage device that includes instructions that, when executed, cause a processor to perform the various operations.

There are many instances where a full 360-degree surround animation of a photography subject may be desirable. For example, consumers may desire to see what a product looks like from all angles. Viewers may wish to see sculptures or clothing outfits from different directions. An automobile dealership may wish to capture 360-degree views of their inventory to show potential buyers that the automobiles do not have dents or scratches and to allow potential buyers to view the automobiles from various angles. Other examples are also possible. However, without the use of specialized photography equipment such as turntables or rail-mounted cameras, surround animations featuring smooth movement can be difficult to capture or produce. A hand-held camera used to capture a images that may be presented as a video may produce shaky or jittery video due to the movement of the user (e.g. walking), hand jitter, variations in the terrain around the object, and so on. Individual image frames captured by a manually held camera may be misaligned or otherwise erratic. In addition, such images may produce an animation that cannot be rotated continuously without discontinuities corresponding to the beginning and ending points of the image capture or corresponding variations from frame to frame.

Embodiments of systems, methods and devices are described below that may be used to capture a plurality of images and to process the plurality of images to produce a 360-degree surround image that may be rotated smoothly. Further, embodiments of the methods and devices described below may be configured to join a first image and a last image of a set of surround images in order to create a seamless and continuously rotatable animation that is not limited by set starting and stopping positions. In some embodiments, the 360-degree surround animations may be captured and processed by the camera device (such as a smart phone, a tablet computing device, or another image processing device), without the need for post-processing or editing by a separate computing device.

On certain embodiments, a camera device may include one or more sensors to detect orientation, angular velocity, inertia, acceleration, and other movement parameters corresponding to directional parameters, orientation parameters, and movement parameters corresponding to a view direction of the camera device. Such movement and orientation parameters may be determined relative to multiple axes. The sensors may include accelerometers, gyroscopic sensors or "gyros" (e.g., vibration gyros, fluid gyros, fiber-optic gyros, ring laser gyros, and quantum gyros), magnetic compasses, inclinometers, and other sensors, such as microelectromechanical systems (MEMS) gyroscopic sensors, which can be used to detect the angular velocity and orientation of the device. MEMS gyroscopes may include a variety of vibrating structure gyroscopes, which can produce analog or digital outputs. In some embodiments, the camera device may include an inertial measurement units (IMUs), which may include electronic devices configured to measure and report velocity, orientation, and gravitational forces using a combination of accelerometers, gyroscopes, and magnetometers. In some embodiments, the camera device may include a global positioning system (GPS) technology, which can also be used to detect position or movement of a device. The outputs can be used to determine position and movement. Other embodiments are also possible.

In certain embodiments, a camera device may capture a plurality of images of an object as the camera device is moved about the object along a substantially circular path. The camera device may capture images periodically or at predetermined spacing about the object and may continue to capture images until the loop or circuit around the object is completed. In some embodiments, the camera device may capture images based on the movement data such that at least one image is captured based on distance (linear or angular) traversed by the camera device. In some embodiments, the distance between adjacent images in the sequence may be predetermined or may be dynamically calculated, and one or more images may be captured each time the camera device traverses the distance. One possible embodiment of a camera device equipped with sensors and configured to create a 360-degree surround animation of a subject is described below with respect to FIG. 1.

FIG. 1 is a block diagram of a system 100 configured to perform surround image capture and processing, in accordance with certain embodiments of the present disclosure. In some embodiments, the system 100 may include a camera device 102, such as a smart phone, a tablet computer, a digital camera, or other digital image capture device. In the depicted embodiment, the camera device 102 can be moved along a path 104 around a photography subject 106 (or object to be photographed). In some embodiments, the path 104 may be a closed loop path about the subject 106. In some examples, the path 104 may be substantially circular or elliptical.

In some embodiments, the camera device 102 may include a plurality of instructions that, when executed, may cause a processor to capture a plurality of images of a subject while monitoring motion and orientation parameters as the camera device 102 is moved along the path 104. In some embodiments, the camera device 102 may detect when the plurality of images represents a surround view of the subject.

In some embodiments, the camera device 102 may begin capturing images of the subject at a first position 108. The camera device 102 may be moved from the starting point, around the subject 106, and approximately back to the starting point. In some embodiments, the camera device 102 may be moved in a counter-clockwise direction indicated by arrow 110. In other embodiments, the camera device 102 may be moved in the opposite direction.

As the camera device 102 is moved, the camera device 102 may capture a plurality of images of the subject 106. In FIG. 1, each circle and corresponding arrow oriented toward the subject 106 may represent a position and orientation at which the camera device 102 captures a new image as the camera device 102 is moved around the subject 106. The arrow extending from each circle may indicate the orientation of the camera lens of camera device 102 with respect to that particular image capture event. In some embodiments, the camera lens orientation is fixed relative to the camera device 102, and therefore the optical angle of the camera device 102 changes as the camera device 102 is moved and pivoted around the subject 106.

As described herein, the camera device 102 may include motion and orientation sensors, such as gyroscopic sensors, inclinometers, orientation sensors, and so on, which may be used to determine the angular velocity and movement of the camera device 102. Angular velocity may refer to the change in rotational angle per unit of time, and may generally be expressed in degrees per second. The camera device 102 may use the sensors to determine the camera's rotational motion, changes in orientation and position, and progress around path 104. The motion and orientation data may be stored with or correlated to each image, so that the orientation of the camera device 102 at the time of the image capture may be determined.

Since the circular path 104 may be unknown at the outset (and since the camera device 102 may not traverse a perfect circle), the progress may be measured based on the orientation of the camera device 102. In some embodiments, the camera device 102 may capture images periodically, noting the orientation and motion data with each captured image. In some embodiments, the movement data and orientation data may be used to determine when to capture images. For example, capturing images at substantially equal spatial intervals around path 104 can assist in producing a smooth animation of subject 106, even if the speed of movement of the camera 102 is not consistent as it moves along the circular path 104. In other embodiments, motion and time may be used to determine when to capture image data, and the motion and orientation information may be correlated to each image so that subsequent processing may utilize the position and orientation information to process the images into a 360 degree surround image. In some examples, the camera device 102 may capture multiple images at regular spatial intervals along the path 104, and selected ones of the multiple images may be used to produce the 360 degree surround image.

In certain embodiments, camera device 102 may include one or more modules configured to use the motion sensor data to control the operation of the camera device 102. A "module" may include one or more physical components of a computing device (e.g., circuits, processors, etc.), may include processor-readable instructions, or any combination thereof configured to cause the physical components to perform a particular task or job. In some embodiments, a module may include instructions that, when executed, can cause a processor to perform a particular task or job. In certain embodiments, the modules may receive and process sensor data to determine the orientation, position, and movement of the camera device 102. In some embodiments, as the camera device 102 is moved about the subject 106, one or more modules may cause the camera device 102 to capture images of the subject 106 based on the movement and orientation data, based on timing, or any combination thereof. In some embodiments when the module determines that the camera device 102 has moved a desired distance or into a desired position and orientation, the module may direct the camera device 102 to capture an image. In a particular embodiment, the one or more modules may control the camera device 102 to capture images at predetermined or dynamically calculated angular intervals around the path 104. The modules may also use the sensor data to determine when to stop capturing images (e.g., when the camera has made an approximately complete 360 degree circuit around circular path 104). For example, specific angular intervals can be entered, or a number of desired images may be specified. In some embodiments, the specific angular interval can be dynamically calculated based on the movement of the camera device 102, the size of the subject 106 within the view area of the camera device 102, or another parameter.

For example, the camera device 102 of FIG. 1 may be moved about the path 104 beginning at a starting position 108. The camera device 102 may receive an input that initiates a 360 degree surround image capture routine. One or more modules within camera device 102 may use the sensor data to determine the starting position and orientation of the camera device 102. A first image of subject 106 may be captured from the starting position 108. As the camera device 102 is moved in a counter-clockwise direction indicated by arrow 110, the sensors may detect the movement and orientation and may generate sensor data reflecting the movement and orientation. The one or more modules may cause the camera device 102 to capture images and to associate the sensor data to each image. In some embodiments, the one or more modules may capture the images periodically or may use the sensor data to determine when to direct the camera device 102 to capture another image.

In a particular illustrated example, the module may capture an image at each of a plurality of positions of the camera device 102. Any number of images may be captured of a particular subject 106. In the illustrated example, the camera device 102 may capture images at each of sixteen positions about the subject 106, e.g., approximately 22.5 degrees of rotation of the camera device 102 around the path 104 between each image. In some embodiments, the one or more modules may control the camera device 102 to capture one or more images of the subject 106 at particular spatial intervals along the path 104. Subsequently, the camera device 102 (or another computing device) may process the plurality of images, selectively discarding some and selectively adjusting (aligning, shifting, or warping) some, to produce a 360-degree view of the subject 106.

In a particular example, a first image may be captured at the starting position 108 corresponding to 0 degrees, a second image may be captured once the camera device 102 has moved a pre-determined distance (linear or angular) along a path 104. In the illustrated example, the camera device 102 may capture a second image at a location that is approximately 22.5 degrees along the path 104, a third image may be captured once the camera 102 has moved an additional 22.5 degrees, and so on. The angular distance is for illustrative purposes only, and is not intended to be limiting. Other angular distances may be used. In other embodiments, a linear distance may be used. In some embodiments, a time parameter may be used. In some embodiments, the number of images may be selected by a user, may be based on a selected resolution, may be based on a pre-programmed setting, may be dynamically selected based on the camera movement and a relative size of a subject object within the view area of the camera device, based on another parameter, or any combination thereof. In an example, if the sensor data indicates that the camera is moving in a relatively tight (small) circle (e.g. around a small subject 106, such as a flower or a coffee mug), the one or more modules may direct the camera device 102 to take a small number of images. If the sensor data indicates that the camera device 102 is moving in a larger circle (e.g. around a large subject 106 such as a building), the one or more modules may direct the camera device 102 to take a greater number of images. Other embodiments are also possible.

Once the sensor data indicates that the camera device 102 has fully or approximately fully traversed path 104 and returned to position 108 or moved past the position 108, the one or more modules may direct the camera device 102 to cease capturing images. In some embodiments, the one or more modules may cause the camera device 102 to stop capturing images at position 112, just short of starting position 108. In some embodiments, the one or more modules may direct the camera device 102 to capture another image at approximately position 108 once a full rotation has been made.

In some embodiments, the path 104 may be irregular, and the one or more modules may direct the camera device 102 to capture images at locations that are within a threshold distance from idealized or selected angular positions along the path 104. For example, if the camera device 102 is being carried by a human operator, the path 104 is very likely to contain irregularities as the operator will have a difficult time moving in a perfectly circular path. The position of camera device 102 at point 108 at the beginning of the path 104 may not exactly correspond to the position or orientation of camera device 102 when the operator completes the circuit along the path 104. Accordingly, the one or more modules may initiate image capture with tolerances or thresholds that allow for an irregular path about the subject 106. Other embodiments are also possible.

In some embodiments, the one or more modules may direct the camera device 102 to capture multiple images at each selected position along path 104. For example, the one or more modules may direct the camera device 102 to capture three images when within a threshold distance of each selection position. Additional or "extra" images may allow the modules to discard images that are out of focus, exhibit different light or color balances from other captured images, or are less in line with other captured images for the purposes of creating a smooth animation. Other embodiments are also possible.

In some embodiments, once the plurality of images of the subject 106 have been captured to complete the 360 degree circuit of the subject, the camera device 102 (or another computing device) may process at least some of the plurality of images to align the first image to a last image and to align images between the first and last images to produce a smooth 360-degree surround animation of the subject 106. An example embodiment of camera device 102 and the included modules is described below with respect to FIG. 2.

Figure 2:
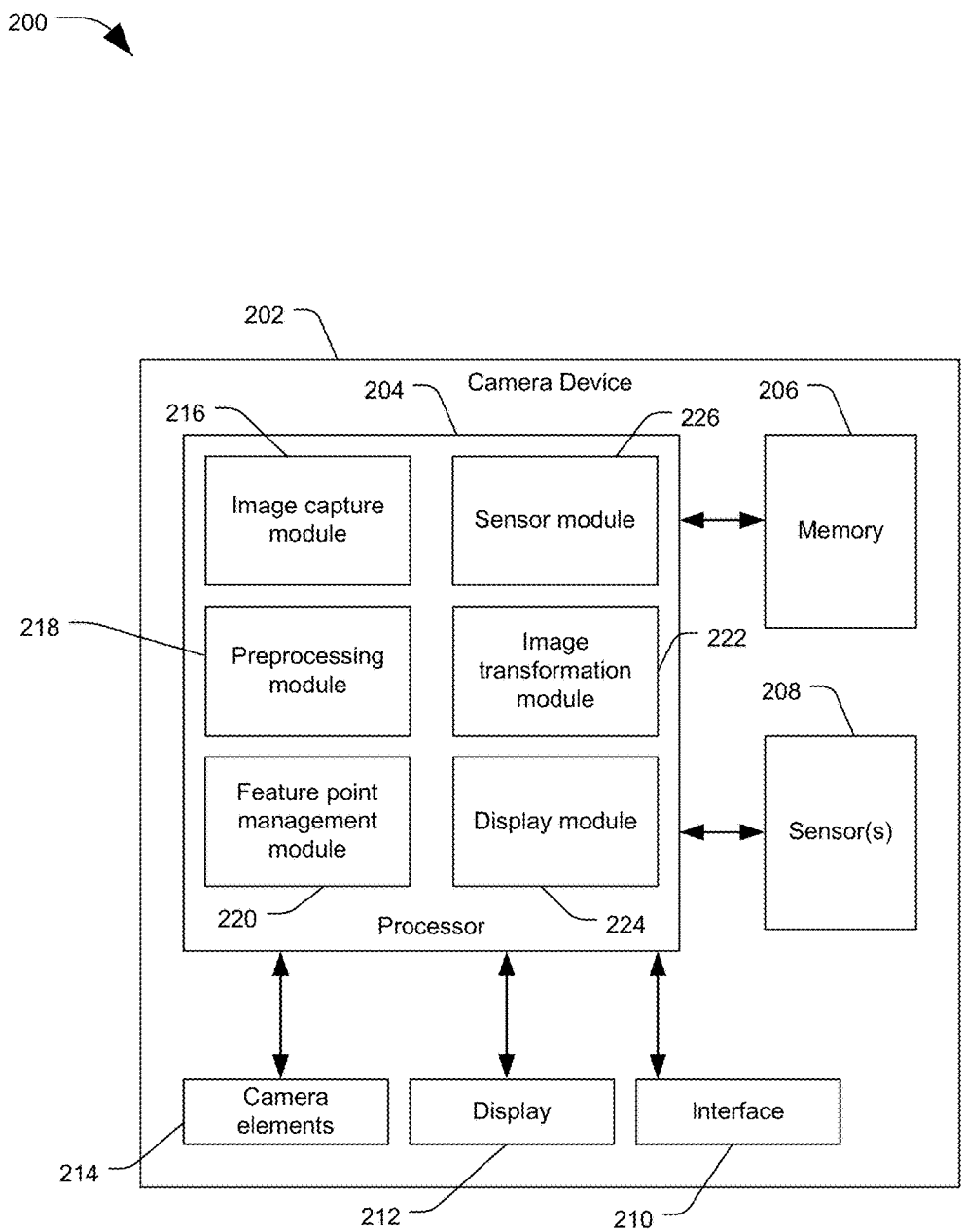
FIG. 2 illustrates a block diagram of a system configured to perform surround image capture and processing, in accordance with certain embodiments of the present disclosure.

FIG. 2 is a block diagram of a system 200 configured to perform surround image capture and processing, in accordance with certain embodiments of the present disclosure. The system 200 may include a camera device 202 (sometimes referred to as "camera"), which may include a digital camera, a smart phone, a tablet computer, a laptop computer, another computing devices, other devices, or any combination thereof. In some embodiments, the camera device 202 may be an embodiment of the camera device 102 in FIG. 1. The camera device 202 may include a processor 204, a memory 206, a one or more sensors 208, an interface 210, a display 212, camera elements 214 (such as optical sensors), other components, or any combination thereof.

Camera elements 214 may include one or more lenses, photoreceptors, light-emitting flash elements, other components configured to capture image data, or any combination thereof. The camera elements 214 may further include one or more optical sensors configured to capture images of a view area.

The display 212 may include components configured to provide visual data, such as images, data, and other information. In some embodiments, the display 212 may be configured to provide visual feedback about the operations of camera 202. For example, display 212 may include a liquid crystal display (LCD) screen, a light-emitting diode (LED) screen, a touchscreen, or any other screen or display of a digital camera, smart phone, or other camera-equipped device. The display 212 may be configured to provide image data to a user. Image data may include data corresponding to the view (image data) captured by the camera elements 214, previously recorded images or video, indicators of camera settings or modes (e.g. flash, micro or macro settings, etc.), indications of a focus point of the camera elements 214, feedback or instructions to a user regarding operating the camera device 202, other data, or any combination thereof. The display 212 may present text, images, color indicators, other visual data, or any combination thereof.

The interface 210 may include one or more communication interface ports or components, direct interface elements, other interface components, or any combination thereof. For example, communication interface components may include ports configured to couple to a universal serial bus (USB) cable connector, a high-definition multimedia interface (HDMI) cable connector, other physical connectors, or any combination thereof. In some embodiments, the interface 210 may also include wireless communication elements, such as a transceiver configured to receive and transmit data via WiFi, Bluetooth®, infrared communication, or other wireless communication protocols. In some embodiments, the interface 210 may include direct interface elements, such as one or more buttons, switches, knobs, rollers, other selectable elements, a touchscreen or other interface, or any combination thereof, which may be accessed by a user to interact with the camera device 202.

In some embodiments, a graphical user interface (GUI) may be generated by processor 204 (e.g. using display module 224) and presented on display 212. The GUI may be configured to provide information, and may include one or more user-selectable elements, such as buttons, checkboxes, pulldown menus or other elements with which a user may interact by interacting with the interface 210. In some embodiments, the display 212 and the interface 210 may be combined, for example, via a touch-screen display through which a user may interact with the elements of the GUI. Other embodiments are also possible.

The one or more sensors 208 may include sensors configured to detect position, orientation (direction, incline, etc.), angular velocity, acceleration, and other movement parameters of the camera device 202. For example, the one or more sensors 208 may include one or more MEMS gyroscopic sensors, IMUs, or other sensors capable of detecting the movement and orientation of the camera device and capable of providing such movement and orientation data to the processor 204. The movement and orientation data may be used by the processor 204 to determine movement of the camera device 202 along a path, to determine when to capture images, to determine which images to discard, and, at least in some instances, to determine how to adjust the images.

The memory 206 may include one or more volatile or nonvolatile memory devices, such as dynamic random access memory (DRAM), Flash solid state memory, other memories, or any combination thereof. The memory 206 may store images and video data recorded by the camera device 202, may store other data including user data, or any combination thereof. The memory 206 may also store device basic input-output system (BIOS) data, an operating system or other computer instructions to control operations of the camera device 202, application software or other program modules, other data, or any combination thereof. In some embodiments, the memory 206 may store instructions that, when executed, cause the processor 204 to perform processes and methods as described herein regarding surround image capture and processing. Other embodiments are also possible.

The processor 204 may include one or more central processing units (CPUs), image processors, graphics processing units (GPUs), microprocessors, application-specific integrated circuits (ASICs), field programmable gate arrays (FPGAs), other circuits, or any combination thereof. The processor 204 may include one or more modules to control the operation of various tasks and processes. The modules may include an image capture module 216, a preprocessing module 218, a feature point management module 220, an image transformation module 222, a display module 224, a sensor module 226, other modules, or any combination thereof.

The sensor module 226 may be configured to receive and process data received from the one or more sensors 208. For example, the sensor module 226 may determine a position and orientation of the camera device 202 based on sensor data. In some embodiments, the sensor module 226 may use data from the one or more sensors 208 to determine whether the camera device 202 is oriented to record vertical (or "portrait") images, or to record horizontal (or "landscape") images. Further, the sensor module 226 may be configured to determine acceleration and orientation of the camera device 202 relative to an object 106. Other embodiments are also possible.

The image capture module 216 may control camera elements 214 in order to capture image data. In some embodiments, image capture module 216 may determine when to capture images, such as based on a sensor data received from the one or more sensors 208 or from the sensor module 226. For example, the image capture module 216 may determine when to take a picture based on the position and angular velocity of the camera device 202 along the path based on program settings or user selections. In some embodiments, the image capture module 216 may determine how often to capture images based on a specified change in position along the path (e.g. configured to capture an image every n-degrees of change along the 360 degree path or every x-units of distance along a linear path), or based on a selected number of images to capture (e.g. a selection to capture 36 images may require capturing images approximately every 10 degrees of the 360-degree path or every x-units of distance along a linear path). In some embodiments, the image capture module 216 may capture more images than specified and may select from the images to determine the pre-determined number. By capturing images based on the positioning and movement of the camera device 202, the image capture module 216 may capture images that are spaced apart substantially evenly and may provide a substantially consistent frame rate in produced animations, regardless of the consistency and speed of the movement of the camera device 202.

In some embodiments, the camera device 204 is within a threshold distance of a calculated image-capture position, the image capture module 216 may send one or more signals or commands to the camera elements 214 to capture one or more images. The captured image data may be stored to the memory 206. The image capture module 216 may also determine when the camera device 202 has moved in a substantially full circuit along the path, and may signal that the image capture phase has completed.

The preprocessing module 218 may perform a number of processing steps on captured images prior to image alignment and animation smoothing processes. For example, if the sensor module 226 indicates rotation or other changed orientation of the camera device 204 (e.g., from portrait to landscape) during image capture, the preprocessing module 218 may rotate or re-orient selected images to provide a consistent orientation prior to image alignment and smoothing. In some embodiments, the preprocessing module 226 may selectively resize, down-sample, or otherwise adjust selected images of the image sequence such that the images are all approximately the same size. In certain embodiments, the images may be altered to be approximately 480 pixels wide by 270 pixels wide before further processing. Adjusting the image sizes to be approximately equal may enhance image processing speed and reduce dependency on user-selected resolution (e.g., 1080p, 720p, etc.) for the captured and subsequently displayed images.

In another example, preprocessing module 218 may perform image analysis to determine whether certain frames are out of focus, significantly out of alignment with nearby frames, or otherwise poor image candidates. In certain embodiments, accelerometer readings may be used to detect large motion during the capture of a frame. Such large motion may be a strong indicator of a blurry frame. In certain embodiments, if image analysis indicates that there is substantial color blurring or loss of contrast within a frame or if image analysis identifies significant changes from image to image, one or more of the images may be discarded. For example, if there is a large change in the color values for each pixel from one frame to the next, it may indicate that a user's hand was jostled, that the lens was partially obstructed, or that some other interfering event occurred, and the preprocessing module 218 may discard the image because the image may be a poor candidate for producing a smooth animation. Similarly, changes in lighting, contrast, or other features may also indicate frames that should be discarded. The preprocessing module 218 may use preset or adjustable thresholds to determine images to keep or to discard. For example, if there is a greater than a 30% change in pixel values between successive images, the preprocessing module 218 may determine that the frame exhibiting the large change should be discarded. Other embodiments are also possible.

The feature point management module 220 may identify feature points within the captured images that may represent comparison points. For example, the feature point management module 220 may use computer vision algorithms to select points or pixels within an image relative to other points or pixels that may be distinctive based on color, brightness, contrast, surrounding shapes or patterns, or based on other parameters. In certain embodiments, if no feature points can be detected within a given frame, the absence of feature points may also be used as an indication that a particular frame is too blurry. In some embodiments, the feature point management module 220 may determine coordinates of each selected point within an image (e.g., X and Y coordinates of pixels of the selected point), other attributes of the selected points (e.g., color value of the selected point), or other data, and may store the determined information as metadata associated with the particular image.

The feature point management module 220 may determine selected points that can be tracked between sets of successive images (e.g., a set of 10 successive frames or images). In some embodiments, the feature point management module 220 may determine whether points with X,Y coordinates, colors, contrast, surrounding features, or other identifying details can be located in a next frame that substantially correspond to one or more preceding frames. If a selected point cannot be tracked for a selected number of successive frames, the feature point management module 220 may discard the selected point as a poor feature point for tracking purposes. In some embodiments, the feature point management module 220 may also calculate a distance and a direction that a selected feature point moves from one image to a next, or from one image to another non-successive image (e.g. three images away, or ten images away, etc.). The distance and direction information corresponding to the movement of the selected point between frames or images may be called "tracks". The tracks may also be extended from image to image and joined together to form longer tracks (e.g. the track between point A in frame 1 and point A in frame 2 may be joined to the track from point A in frame 2 to point A in frame 3, etc.). Other embodiments are also possible.

In some embodiments, the feature point management module 220 may employ first parameters to determine feature points within adjacent frames and from frame to frame, and may employ second parameters to determine corresponding feature points between image frames corresponding to the beginning of the image capture operation and image frames corresponding to the end of the image capture operation. In some embodiments, the second parameters may be more lenient than the first parameters. For example, there is a greater likelihood of substantial variation between images captured when a user begins a circular path and when the user arrives back at an ending position near the starting point at the end of the path. For example, the camera device 202 may be closer to or farther from the subject, at a different height, at a slightly different angle, or the captured image may include other differences. Accordingly, points that may be discarded as too dissimilar between immediately successive frames may be sufficiently similar to use to join the beginning and end of a recording.

In some embodiments, the feature point management module 220 may determine feature points prior to image analysis by the preprocessing module 218. For example, the preprocessing module 218 may determine whether to discard an image due to feature points changing position too substantially between frames, due to an image frame having too few corresponding feature points relative to preceding or successive frames, or due to other parameters trackable due to feature points.

The image transformation module 222 may perform image manipulation based on the determined feature points and tracks. In some embodiments, the image transformation module 222 may calculate and apply affine transformations (e.g. rotation, translation, scaling, skew, warp, etc.) to some or all images in the captured image sequence. An affine transformation is a class of linear 2-D geometric transformations that may be used to map variables (e.g. pixel intensity values located at position (x1, y1) in an input image) into new variables (e.g. (x2, y2) in an output image) by applying a linear combination of translation, rotation, scaling, or shearing (i.e. non-uniform scaling in some directions) operations, or any combination thereof. In some embodiments, the image transformation module 222 may select one or more affine transformations to align the transformed feature point tracks from image to image, allowing the adjacent images to be as smooth as possible. For example, images may be translated up or down depending on changes in a height of the camera device 202 between images. Similarly, at least some of the images may be scaled (e.g. zoomed in or out) based on changes in distance between the camera device 202 and the subject during traversal of the 360-degree path, causing the path to be irregular. Images may be skewed if the orientation of the camera device 202 changes relative to the subject. Other embodiments are also possible.

The image transformation module 222 may iterate through the images multiple times, continually processing the images to align feature points to the tracks, adjusting images iteratively and smoothing the feature point tracks with each iteration. In some embodiments, the image transformation module 222 may be configured to perform a selected number of iterations through the images (e.g. five iterations). The number of iterations may be preset, selected by a user, or otherwise determined, such as based on a desired image resolution. In some embodiments, the number of iterations may be fixed for the scale of the object, which number may be determined through experimentation. In some embodiments, the image transformation module 222 may continue to iterate until the tracks meet a selected "smoothness" threshold. For example, when all tracked points are within a set distance of an "ideal" smooth track, the image transformation module 222 may cease image transformation processing.

Once the images have been processed, the image transformation module 222 may combine the individual image frames into an animation file. For example, the images may be combined into a file configured to display one frame at a time, with the final captured or processed frame of the set proceeding without interruption to the first captured or processed frame. In some embodiments, the animation file may be interactive. For example, a user may use a touch screen interface (e.g. display 212 or interface 210) to rotate the animation file forward or backward through the image frames and the image file may present the images in a smooth manner. Further, the user may interact with the interface 210 to zoom in or zoom out, to rotate, or to otherwise interact with the animation. For example, if the images depict a surround animation of an automobile, a user may drag his or her finger across the screen to "spin" the surround animation of the automobile in either direction.

The display module 224 may provide information to display component 212. For example, the display module 224 may generate and provide a GUI to the display 212, and in some embodiments may receive indications of user selections from the interface 210 that correspond to selectable elements of the GUI. The display module 224 may also provide the compiled animation generated by image transformation module 222 within the GUI.

In some embodiments, prior to image capture, the display module 224 may provide a GUI including guidance with respect to performing image capture operations. For example, the display module 224 may provide a GUI including a button and text instructing a user to "tap here to begin image capture." A user may interact with the interface 210 to select the button, signaling the camera device 202 to establish a "starting position," to capture at least one first image and associated orientation and motion data, to capture additional images, and to monitor for movement consistent with capturing a surround animation while capturing additional images. In some embodiments, the modules may be configured to capture images in a set direction (e.g. clockwise or counter-clockwise). The display module 224 may provide instructions to the display 212 to "move left" or "move right" in order to capture images moving in a selected direction. If the one or more sensors 208 detect that the camera device 202 is changing height (i.e., higher or lower relative to the ground), tilting, or angling away from a centroid of the path, the display module 224 may provide adjustment suggestions or directions to the display 212 instructing the user to manipulate the camera device 202 to improve the alignment or orientation to produce superior images. Other embodiments are also possible.

As described above, the feature point management module 220 may be configured to identify and track distinctive "feature points" between captured image frames and to adjust at least some of the images to align feature points from image to image or from one image to a set of images. Embodiments of feature point selection are shown in regard to FIGS. 3A and 3B.

Figure 3A:
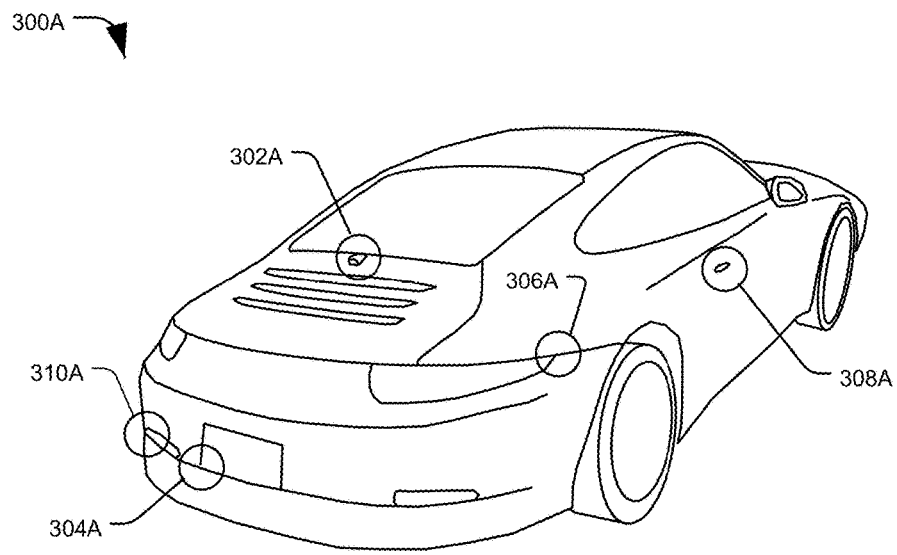
FIGS. 3A and 3B depict an object including selected feature points that may be used to perform surround image capture and processing, in accordance with certain embodiments of the present disclosure.
Figure 3B:
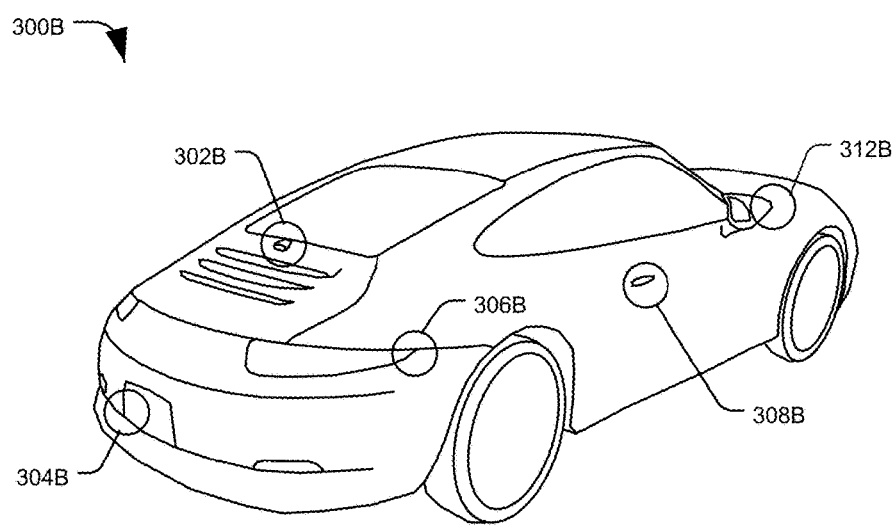

FIGS. 3A and 3B are illustrations of feature points selected in order to perform surround image capture and processing, in accordance with certain embodiments of the present disclosure. FIG. 3A depicts a first illustration 300A of a subject car, which illustration 300A may represent a first frame of a set of images captured as part of a surround image capture method. FIG. 3B depicts a second illustration 300B of the subject car, which illustration 300B may represent a second frame captured after the camera had been moved in a counter-clockwise direction from the position in which the first frame 300A was captured.

The feature point management module 220 may be configured to identify one or more feature points in each captured frame. The feature points may be selected based on colors, contrast, patterns, shapes, brightness, or other distinguishing features relative to the surrounding pixels or image area. In an example embodiment, the feature point management module 220 may identify feature points 302A, 304A, 306A, 308A, and 310A from frame 300A. The feature point management module 220 may cause the processor 204 to store positional data, pixel color or brightness attributes, or other data corresponding to each point identified in frame 300A.

The feature point management module 220 may also cause the processor 204 to identify feature points in frame 300B, such as feature points 302B, 304B, 306B, 308B, and 312B, and to compare attributes of the feature points identified in each frame to determine matching or corresponding feature points between frames. Corresponding feature points may indicate a feature of the subject that can be tracked between frames to determine a smoothness of movement or transition between frames. In some embodiments, feature points in each frame can be identified that do not appear in consecutive frames. For example, feature point 310A from frame 300A may correspond to feature that has moved out of view in frame 300B because the position and orientation of the camera device 202 is changed, and therefore the feature point 310A cannot be tracked between frames. In some embodiments, the feature point may not be identifiable in a subsequent frame due to other factors, such as change in lighting, reflection, coloration, obstruction, or other factors. In some embodiments, the feature point management module 220 may cause the processor 204 to select or discard a feature point that cannot be identified in a subsequent frame, a set number of consecutive frames (e.g., three, ten, or some other number of consecutive frames), some percentage of consecutive frames (e.g., identified in seven frames out of ten consecutive frames), based on another metric, or some combination thereof.

Although feature point 312B of frame 300B was not identified in frame 300A, the camera may determine the feature point 312B is distinctive. In some embodiments, the feature point 312B may be determined in a subsequent image or frame. In some embodiments, the feature point 312B may not be distinctive or may not be determined in subsequent frames, in which case the feature point 312B may be discarded.

In some embodiments, the feature point management module 220 may attempt to match feature elements that are independently identified in each frame based on a feature selection algorithm. In some embodiments, the feature point management module 220 may attempt to "locate" a feature point identified in a previous frame by searching the image for similar characteristics (e.g. color, relative location, etc.).

Once a set of feature points is identified in a set of frames, the feature point management module 220 may cause the processor 204 to use the identified feature points to perform image adjustments (rotation, skew, warp, horizontal or vertical shift, or other adjustments), alignment (horizontal or vertical adjustments), and animation smoothing. An example embodiment of a method of image alignment and animation smoothing is described below with respect to FIG. 4.

Figure 4:
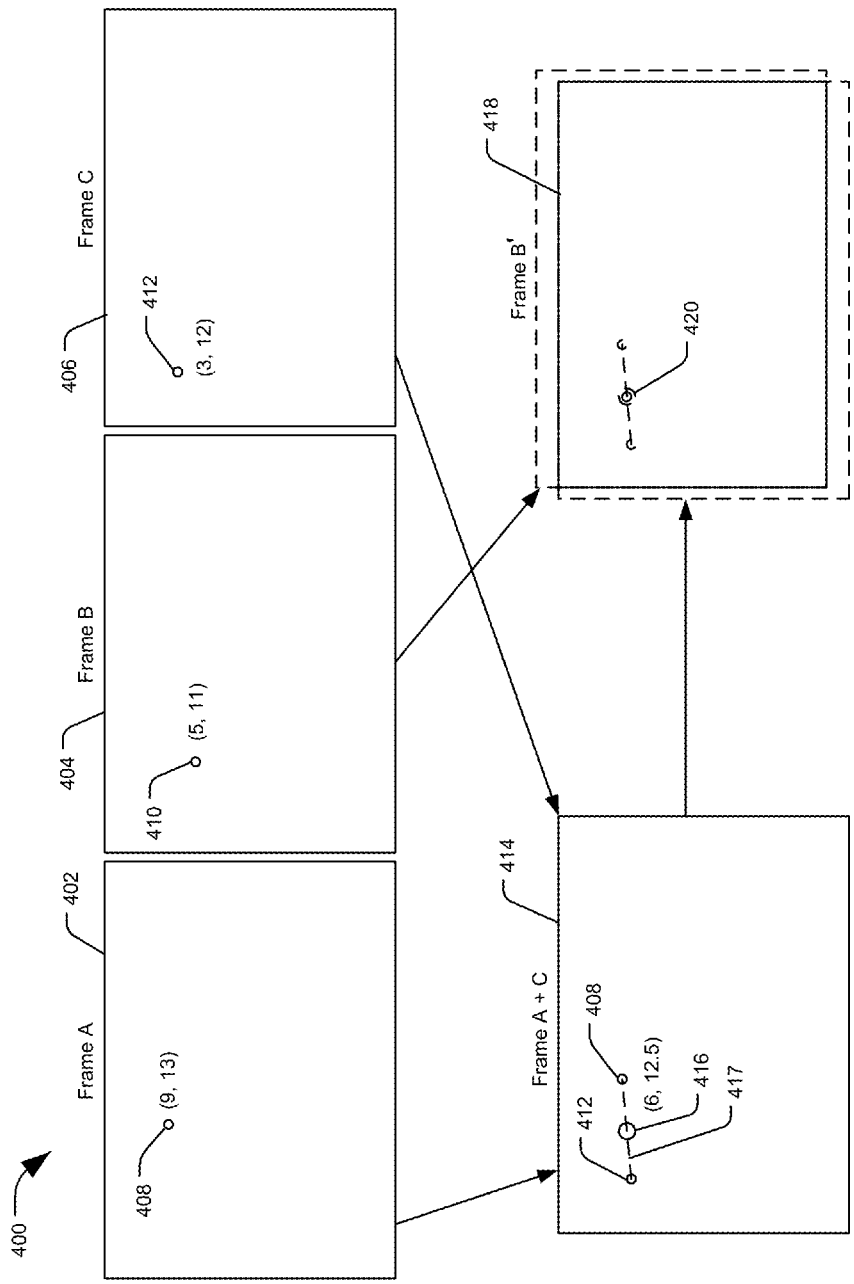
FIG. 4 depicts a block diagram of a sequence of frames having selected feature points that may be used to adjust frames to provide surround image capture, in accordance with certain embodiments of the present disclosure.

FIG. 4 is a block diagram 400 of a sequence of frames including selected feature points that may be used to adjust frames to provide surround image capture, in accordance with certain embodiments of the present disclosure. The diagram 400 includes a set of three consecutive image frames: Frame A 402, frame B 404, and frame C 406. Each of the depicted frames includes a corresponding feature point: feature point 408, 410, and 412, respectively. The feature point 408, 410, and 412 in each frame may correspond to the same point or feature on a subject. Between the times when the three depicted frames were captured, the x-y coordinates of the feature points changed because the position and/or orientation of the camera device changed. With respect to a pixel location, the feature point 408 may be located at an x-y pixel position (9, 13); the feature point 410 may be located at an x-y pixel position (5, 11); and the feature point 412 may be located at an x-y pixel position (3, 12).

In order to perform image alignment and animation smoothing, the feature point management module 220 may cause the processor 204 to select two non-consecutive frames. In the depicted embodiment, frame A 402 and frame C 406 may be selected, and a midpoint may be calculated that is between the feature point 408 in frame A 402 and the feature point 412 in frame C 406. The comparison of frame A 402 and frame C 406, as well as the calculated midpoint are shown in frame A+C 414. In some embodiments, the midpoint between two x-y coordinates may be calculated as follows:

$$([(x1+x2)/2], [(y1+y2)/2]) \qquad (1)$$

where (x1, y1) represents the x-y coordinates of a first pixel position of the selected feature point 408, and (x2, y2) represents the x-y coordinates of a second pixel position of the selected feature point 412. In the instant case, the midpoint between feature point 408 and feature point 412 may be calculated as ([(9+3)/2], [(13+12)/2])=(6, 12.5), represented as the midpoint position 416 in frame A+C 414.

Once the midpoint between selected feature points in non-consecutive frames is determined, one or more affine transformations may be calculated or determined to apply to one or more intervening frames between the non-consecutive frames to align the selected feature point to the track, to the midpoint, or both. In certain embodiments, a set of linear equations may be used to identify a least-squares solution for the affine transform, which maps the points in one or more intermediate frames to the midpoints while minimizing the squared error between them (between the transformed points and the midpoints). The affine transformation may include a plurality of parameters. In certain embodiments, each pair of corresponding points (one from the middle frame points and its corresponding midpoint) provides two equations, one for the x-coordinates and one for y-coordinate. If there are thirty pairs of corresponding feature points, there may be sixty linear equations with six unknowns, which can provide an overdetermined system of linear equations.

In certain embodiments, a random sample consensus approach may be used. The approach may include choosing a number of random subsets of three correspondences at a time. This approach can be used to find an exact solution for the affine transformation that maps the points perfectly (six equations and six unknowns). The system may then determine an error induced by using the same affine transform for all of the other 27 pairs of points. The system can perform this calculation iteratively (hundreds of times), and can settle on the transform that has the most "inliers" (i.e., the most points that have small errors under the transform).

In certain embodiments, when determining the affine transformations, the relational analysis may be performed that best brings each of the points in one frame into alignment with each of the transformed points in the other frames. If the distance between pairs of points changes, the distance between the midpoints will have changed by half as much. Assuming each frame is numbered sequentially based on the order in which it was taken, the intervening frames may be frames sequentially located after a first frame in the non-consecutive set of frames, and prior to a second frame in the non-consecutive set of frames (e.g., between frame A 402 and frame C 406). The affine transformations may be selected based on which transformations will bring the corresponding feature points of the intervening frames in line with the calculated midpoint 416. In the example embodiment, frame B 404 is translated (e.g. moved) to bring feature point 410 in line with the calculated midpoint 416. The transformed frame B is depicted in FIG. 4 as frame B' 418. In frame B' 418, the feature point 410 has been moved to midpoint 416, now depicted as point 420.

Different image frames may include visual matter not shown in adjacent frames, due to lighting, waver or movement of the camera device 202, orientation changes, or other factors. Accordingly, when a frame is translated or otherwise transformed, portions of the frame or nearby frames (e.g. at the periphery of the images) may be cropped or removed to maintain consistent views between consecutive frames.

With the feature point 410 of frame B 404 moved into line with the midpoint between the feature points of frames A 402 and C 406 to create frame B' 418, the alignment of the frame sequence may be improved. When viewed in sequence, frames A 402, B' 418, and C 406 may be presented in a fast sequence to provide a smooth animation, with the feature represented by feature points 408, 410, and 412 moving in a smooth line or "track", which track may be continuous, allowing the user to rotate the animation 360 degrees without visual discontinuities.

In the example of FIG. 4, a simplified embodiment is described in which a single feature point is tracked between frames. However, in some embodiments, multiple feature points may be tracked, and other or additional affine transformations (e.g. rotation, scaling, skew, etc.) may produce superior results. For example, rather than moving a single point to a calculated midpoint, the camera may attempt to perform affine transformations that will adjust image alignment based on thirty feature points being moved as close as possible to thirty calculated midpoints. In some embodiments, rather than performing such transformations on images between two non-adjacent frames or sets of frames, a smooth track may be calculated for each of the plurality of feature points and may be adjusted from frame to frame and across all of the frames including the start and end frames to provide the smooth animation.

In some embodiments, after performing transformations on frame B 404 to create frame B' 418, the camera may iterate to a next set of frames. For example, the camera may next select frame B' 418, frame C 406, and frame D (not shown) and repeat the process. Midpoints may be calculated between feature points of frame B' 418 and feature points of frame D, and frame C 406 may be transformed to bring corresponding feature points as close as possible to the calculated midpoints. Other embodiments are also possible.

In some embodiments, the feature point management module 220 may use different ranges of non-consecutive frames. For example, rather than using three consecutive frames, the feature point management module 220 may calculate midpoints of feature points between frame 1 and frame 9, and use the calculated midpoints to transform frame 5 in the middle. In some embodiments, the feature point management module 220 may calculate averages of midpoints based on feature points from every frame in a set. For example, the feature point management module 220 may use feature point coordinates of frames 1-4 and 6-9 to calculate a midpoint to adjust the positioning of frame 5. In some embodiments, the feature point management module 220 may use feature point coordinates of frames 1 through 9, including frame 5, to calculate midpoints to apply in transforming frame 5. Other embodiments are also possible.

The frame comparison and midpoint calculation may similarly be performed between the last set of frames at the end of the image recording path, and the first set of frames from the beginning of the image recording path, in order to align the images and create a smooth animation that seamlessly joins the beginning and ending frames. For example, if a set of recorded frames includes frame 1 through frame N, the feature point management module 220 may perform a comparison wherein feature point midpoints are calculated between frame N−1 and frame 1 to apply in transforming frame N, and between frame N and frame 2 to apply in transforming frame 1, etc. The start and endpoint misalignment may be greater than the misalignments between selected feature points of adjacent frames. Accordingly, an end point transformation may cause an iterative re-alignment or adjustment of the intervening frames, producing the smooth animation through a plurality of iterations.

In some embodiments, the feature point management module 220 may iterate through all frames one or more times to perform repeated image alignment and animation smoothing operations. In certain embodiments, each iteration may improve image alignment and smoothing. In some embodiments, the feature point management module 220 may iterate through all images a selected number of times, which number may be preset or selected by a user. In some embodiments, the feature point management module 220 may continue iterating until all feature points (or some threshold percentage of feature points) are with a threshold distance of the corresponding calculated midpoints.

In some embodiments, each iteration through the frames may employ the same smoothing algorithm. For example, the feature point management module 220 may select a set of a pre-determined number of image frames each time, such as three image frames, nine image frames, or some other number of image frames, and may employ the same smoothing algorithm to each image in the set or for each iteration. In other embodiments, the feature point management module 220 may employ different algorithms for each image in the set or for each iteration. For example, on the first iteration, the feature point management module 220 may use sets of frames (such as three frames), then sets of a different number of frames (such as five frames) for the second iteration, and so on. The number of frames may increase, decrease, or stay the same from iteration to iteration. Further, the adjustment performed on the frames may vary from iteration to iteration. Other embodiments are also possible.

In some embodiments, instead of calculating a midpoint between selected feature points, the feature point management module 220 may calculate a vector 417 connecting selected feature points. As used herein, "vector" may refer to a straight line between two points, and the feature point management module 220 may align intervening frames to the vector 417 to provide a visually smooth transition from frame to frame along a motion vector determined from the selected feature points (visually distinct features within the selected images). For example, rather than aligning intervening frames to the midpoint 416 of the vector 417, the feature point management module 220 may align the feature point of an intervening frame to a point along the calculated vector 417 nearest to the feature point. Over a sequence of iterations, a moving window of selected frames (e.g., frames 1-10 in a first window, frames 2-11 in a second window, and so on) may be used to determine different vectors, and the translations or adjustments to the vector may be applied iteratively to align the sequence of images. Other embodiments are also possible.

In some embodiments, the feature point management module 220 may utilize first alignment algorithm for a first iteration through the sequence of images and may use a second alignment algorithm for a second iteration (and optionally another alignment algorithm or one of the first and second algorithm for subsequent iterations). In certain embodiments, the feature point management module 220 may use a course alignment algorithm for a first iteration, a less course or fine alignment algorithm for a subsequent iteration. In some embodiments, the feature point management module 220 may process the images in the sequence interatively with increasingly fine alignments. In a particular example of a course alignment algorithm, the feature point management module 220 may select boundary frames (e.g., a first frame (N) and a second frame (N+T)) and may align the corresponding feature point of an intermediate frame (N+T/2) to the track connecting the feature points in the boundary frames. In subsequent iterations, the spacing between the boundary frames may be reduced incrementally to decrease the size of the window. In an example, the first iteration may involve a midpoint of images that are 16 frames apart, while the second iteration may involve a midpoint of images that are 8 frames apart, then 4 frames apart, then 2 frames apart, etc. In this example, subsequent iterations may produce a finer alignment as compared to the course alignment of the first iteration. Other embodiments are also possible.

As discussed above, the feature point management module 220 may perform additional modifications to image frames beyond affine transformations, such as re-sizing, down-sizing, or otherwise adjusting image frames. In some embodiments, visual elements about a periphery of the images may be blurred to reduce visual artifacts. An example embodiment is depicted in FIG. 5.

Figure 5:
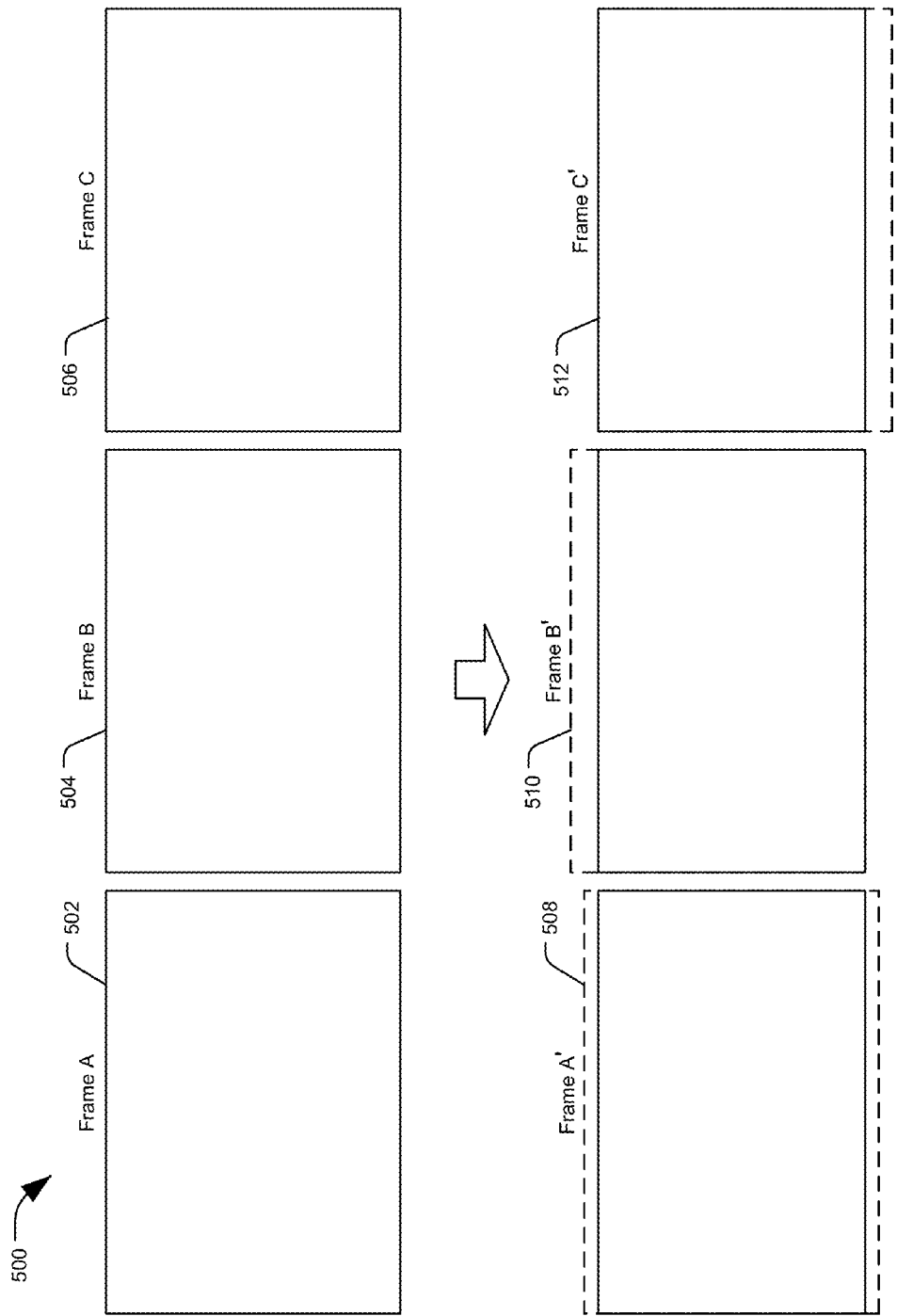
FIG. 5 depicts a block diagram of a sequence of frames or images that may be adjusted and aligned to perform surround image capture and processing, in accordance with certain embodiments of the present disclosure.

FIG. 5 is a block diagram 500 of a sequence of frames or images that may be adjusted and aligned to perform surround image capture, in accordance with certain embodiments of the present disclosure. The diagram 500 may include a set of three frames as originally captured: frame A 502, frame B 504, and frame C 506. The three frames may correspond to frames A through C of FIG. 4. After performing affine transformations to align the images to generate a smooth animation, further processing of the images may be desired.

For example, assume that a user was operating the camera device to capture the images, and during the capture of frame B 504 the camera device was directed at an incline or angle that is higher than at least some of the surrounding images. The camera may adjust frame B 504 to translate the image "down" in order to align the selected feature points with those of the surrounding images to produce a modified frame B' 510. Similarly, the camera device may have been directed at an orientation of angle that is lower that at least some of the other frames during the period of time in which the camera device captured frame C 506. The feature point management module 220 may translate frame C 506 "up" in order to align selected feature points with those of surrounding images to produce an adjusted frame C' 512. Frame B 504 may have included imagery at the top of the frame that was not captured in surrounding frames because of the camera angle. Similarly, frame C 506 may have included imagery at the bottom of the frame not included in surrounding frames because of the camera angle. Accordingly, while processing the frames, the feature point management module 220 may crop or trim the top of frame B 504 based on the amount of translation of frame B 504 during processing.

In the illustrated example, the trimmed portion of frame B 504 may be represented by the dotted lines on the adjusted frame B' 510. A similar type of cropping may be performed on the frame C 506 to produce the adjusted frame C' 512, but a different portion of the frame may be cropped. In some embodiments, a frame may have a dimension of M pixels by N pixels, and trimming or cropping frames may produce adjusted frames having different dimensions (e.g., M pixels by P pixels in size). In some embodiments, it may be desirable to modify all frames to have the same dimensions. In some embodiments, the feature point management module 220 may crop a top portion of a first frame, both top and bottom portions of a second frame, and a bottom portion of a third frame, where the first, second and third frames may be selected from a sequence of frames and are not necessarily sequential frames. In some embodiments, other portions of frames may also be trimmed or cropped (e.g., the left or right sides, for example) due to translating frames left or right. Other embodiments are also possible.

Figure 6:
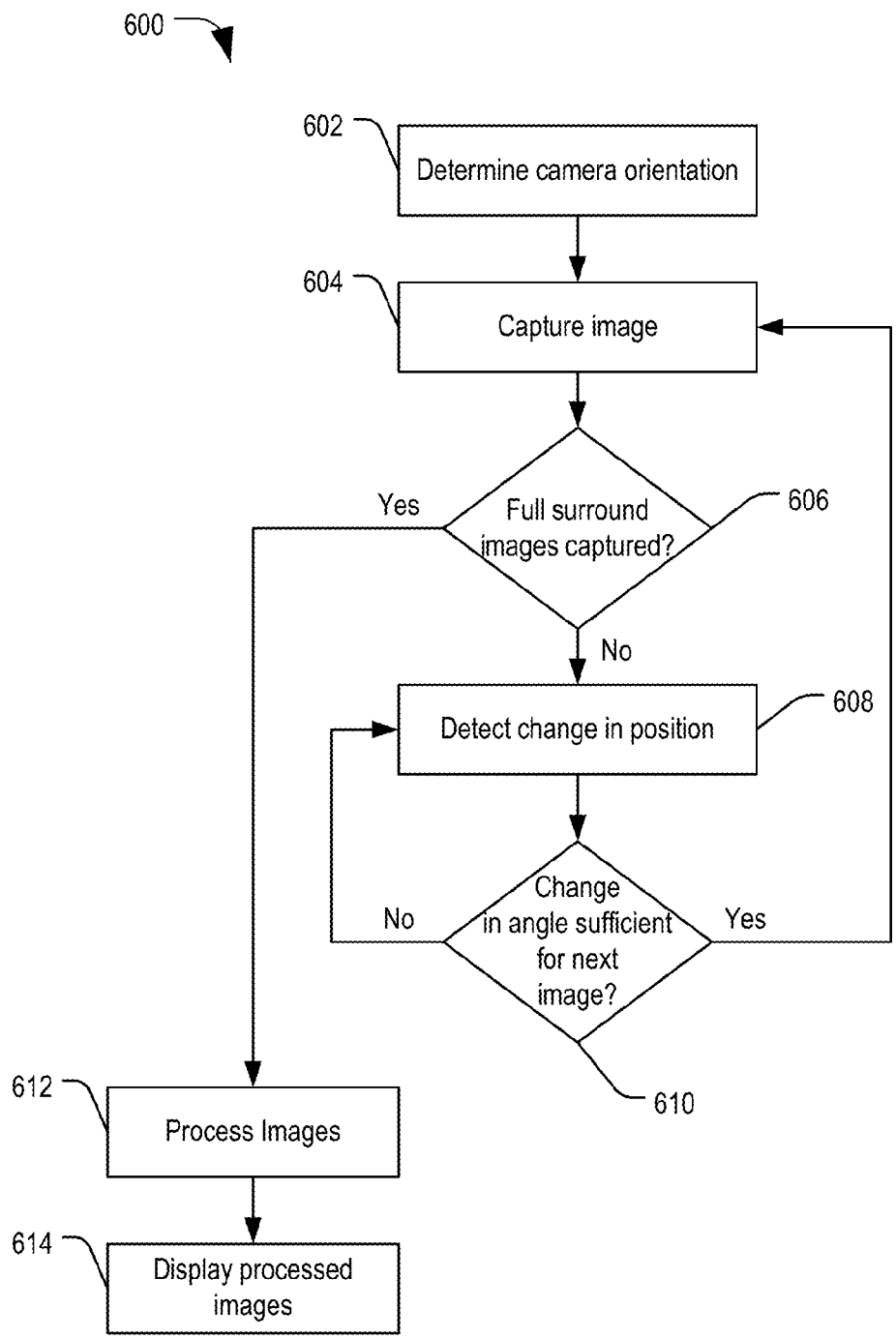
FIG. 6 depicts a flowchart of a method of surround image capture and processing, in accordance with certain embodiments of the present disclosure.

Turning now to FIG. 6, a flowchart of a method 600 of surround image capture and processing is shown, in accordance with certain embodiments of the present disclosure. In some embodiments, the method 600 may be performed by the system 200 of FIG. 2. The method 600 may include determining a camera's orientation, at 602. The camera may be a camera device, such as the camera device 202 in FIG. 2. Determining a camera's orientation may include determining a camera's initial orientation upon activating a surround image capture routine or application. The orientation may be determined using sensors, such as gyroscopic sensors, included in the camera device. The camera's orientation may include data corresponding to a direction in which the camera is pointed or directed and an orientation at which the camera is held or positioned, i.e., horizontal, vertical, or at another orientation relative to a horizontal plane. Determining the orientation at 602 may also include determining the camera's physical location or position, height, angle, or other physical positioning information.

The method 600 may include capturing an image, at 604. A determination may be made at 606 as to whether a full set of surround images has been captured, at 606. For example, the camera device may determine whether it has been moved in a complete circle or circuit based on sensor data, whether a sufficient number of images has been captured, or both.

If a full set of images has not been captured, at 606, the method 600 may include detecting a change in position, at 608. For example, the camera device may monitor sensor data to determine angular velocity, orientation, and other movement of the camera device. The method 600 may include determining whether the change in angle has been sufficient to position the camera to take the next image in the surround image set, at 610. For example, the camera may determine when to capture each image based on a selected number of images to capture in a full circular path, based on a selected change in angular position, based on a selected linear distance traveled, based on time, based on other factors, or any combination thereof. The camera may monitor for when the change in angle or position is within a threshold distance of a selected positional value. The threshold may be used to account for irregularities in a path of movement, to allow the camera to take multiple shots within a positional "window" or range, or for other purposes.

If the change in position has not been sufficient, at 610, the method 600 may include continuing to detect changes in position, at 608. If the change in position is sufficient, the method 600 may include capturing the next image, at 604. Capturing the image at 604 may include capturing a plurality of images.

When a determination is made that a full set of surround images has been captured, at 606, the method 600 may include processing the captured images, at 612. Processing the images may include the image processing as described in regard to previous figures and below with respect to FIG. 7 and FIG. 8. For example, processing may include preprocessing to remove poor images or to apply general image edits, feature point selection, image alignment and animation smoothing, image trimming or cropping, animation file generation from the modified image frames, other processing, or any combination thereof. In some embodiments, after such processing, a sequence of images may be stored that have been adjusted to align selected feature points, and the stored images may be combined, merged, joined, or otherwise associated to provide a 360 degree image or animation. At 614, the method 600 may include displaying the processed images or animations.

Figure 7:
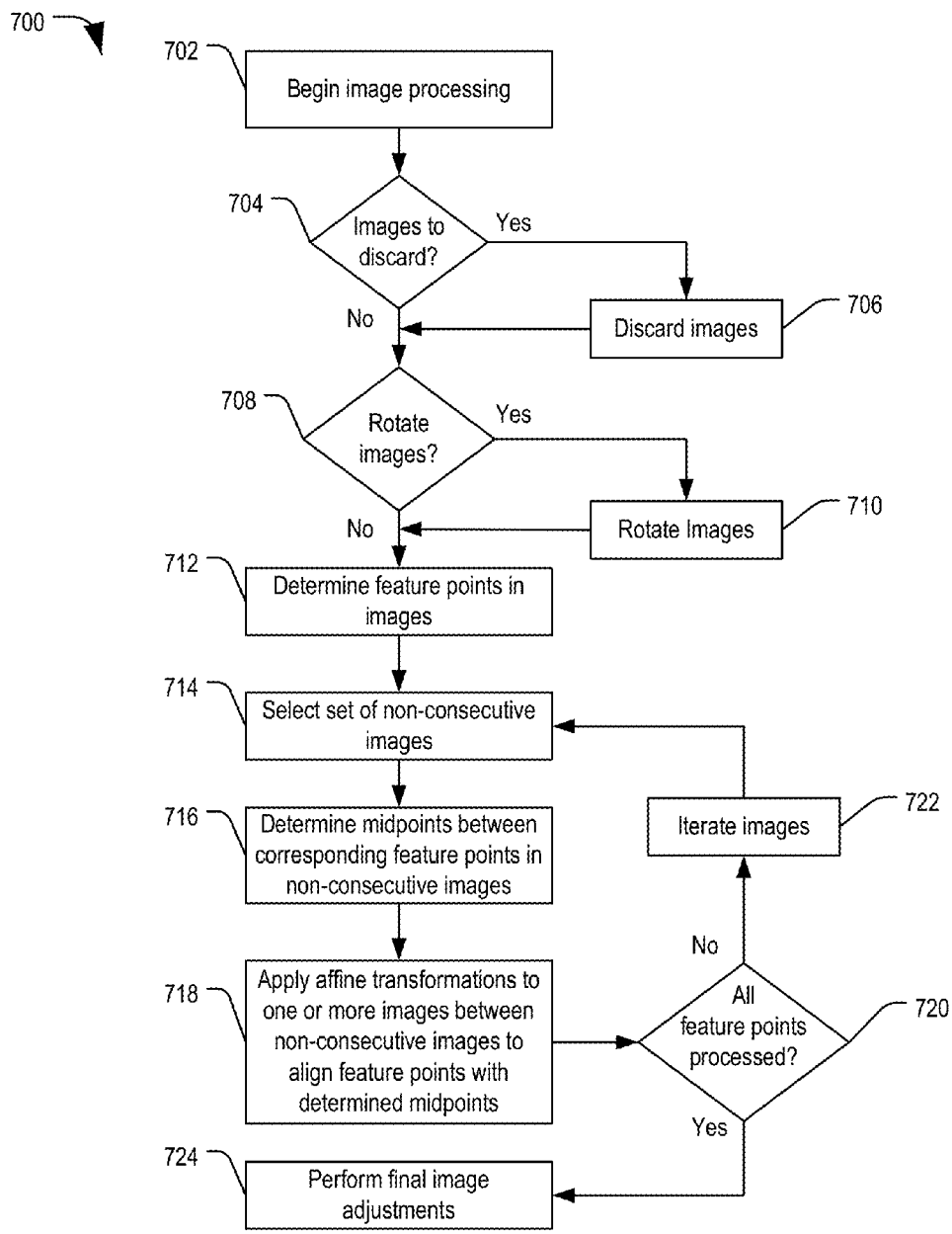
FIG. 7 depicts a flowchart of a method of surround image capture and processing, in accordance with certain embodiments of the present disclosure.

FIG. 7 is a flowchart of a method 700 of surround image capture and processing, in accordance with certain embodiments of the present disclosure. The method 700 may include example embodiments of the step "process images" 612 of method 600. In some embodiments, the method 700 may be performed the by processor 204 of FIG. 2, for example using the preprocessing module 218, the feature point management module 220, and the image transformation module 222.

The method 700 may include beginning image processing, at 702. In some embodiments, image processing may begin when all images in a surround image set have been captured. In some embodiments, the method 700 may include beginning processing prior to capturing all images, in order to produce a completed animation faster. In some embodiments, image processing may begin in response to an input, such as an input selection, a trigger from an input interface or from another device, another source, or any combination thereof.

The method 700 may include determining whether there are images to discard, at 704. In some embodiments, images to discard may be determined by analyzing content of the images. The system may discard images that are out of focus, images that include poor lighting or contrast, images that are substantially out of line with proximate images in the set, images that are otherwise poor candidates for inclusion in a surround animation (such as images with an occlusion or other interference), or any combination thereof. If there are images to discard, the method 700 may include discarding the images, at 706.

The method 700 may include determining if images require rotation, at 708. For example, a camera orientation may be monitored using sensors while images are captured. In some embodiments, an orientation value may be associated with each image in the set. The method 700 may include rotating some or all images to obtain consistent image alignment, to simplify image processing, or to accomplish other purposes. For example, image alignment and animation smoothing processes may be easier to calculate if all images are aligned in the same direction relative to the camera's movement along a closed-loop path. If a determination is made that images are to be rotated, the method 700 may include rotating the images, at 710.

At 712, the method 700 may include determining feature points in the collected images. As described herein, feature points may be identified based on color, brightness, contrast, shapes, patterns, surrounding details, feature points identified in preceding images, based on other details, or any combination thereof. In some embodiments, the feature points may be determined using corner detection. In certain embodiments, for the purpose of detecting feature points, the system may discard the colors and determine image intensities of a greyscale version of the image for each pixel location. The system may then calculate statistics about the image gradients in a local neighborhood of pixels around that location (i.e., how quickly pixels change intensity and in what direction). Potential feature points may be identified based on large intensity changes in two directions (a large intensity change in one direction may indicate an edge, while a change in two directions may indicate a corner). Some pre-determined number of the potential feature points may be selected. The system may select as feature points those pixels or areas having the highest scores with respect to their relative intensities. In certain embodiments, the system may utilize a sum of weighted differences (or autocorrelation) score between nearby pixel areas to determine a corner point or feature point.

In some embodiments, details regarding the identified feature points may be associated with each image and stored to a memory and later retrieved for processing. Corresponding feature points (e.g., feature points identifying the same point or object depicted in the image) may be identified between different image frames. In certain embodiments, the feature points can be identified in each frame and movement of the feature points can be tracked by the system from frame to frame. In certain embodiments, the system may utilize a Lucas-Kanade tracking algorithm to track feature points from frame to frame. Determining feature points may also include discarding feature points that cannot be identified in a set number of consecutive images, or in some threshold number of images from a set of consecutive images (e.g., identifiable in some number of images out of ten consecutive images, such as 6 out of 10, 7 out of 10, or another number out of 10).

In some embodiments, the tracked feature points may form vectors or tracks that span two or more frames. In certain embodiments, starting with the first frame of a sequence of frames, the system may chain tracks together by aligning tracks that correspond to a selected feature point using a greedy algorithm that is configured to find tracks that start within some distance threshold of an existing track from a previous frame. The greedy algorithm makes locally optimal choices at each frame. In some embodiments, there may be overlap between some of the tracks. If the corresponding tracks are grouped, an initial track that ends at a fifth frame of the sequence (for example) may be extended aligning the corresponding tracks from the next image, and so on. In certain embodiments, the grouping of overlapping or corresponding tracks may extend across more than an original number of frames. In some instances, the tracks may extend through the entire sequence of frames. Other embodiments are also possible.

The method 700 may include selecting a set of non-consecutive images, at 714. For example, the method 700 may include selecting image frames 1 and 3, or image frames 7 and 11. In some embodiments, selecting non-consecutive images may include selecting two or more sets of consecutive images, which are not consecutive to each other (e.g., frames 1-3 and 7-9).

At 716, the method 700 may include determining midpoints between corresponding feature points in the selected non-consecutive images. For example, the method 700 may include calculating an (X,Y) coordinate of a midpoint between feature point A in frame 1 and feature point A corresponding to the same image feature in frame 3.

The method 700 may include applying one or more affine transformations to one or more images between the non-consecutive images, in order to align feature points in the selected image with the calculated midpoints from the consecutive images. For example, the method 700 may include calculating a midpoint between point A in frame 1 and point A in frame 5, and then performing affine transformations on frame 3 to align point A from frame 3 with the calculated midpoint. In some embodiments, a frame may include multiple feature points, and not all feature points can be brought exactly to the corresponding calculated midpoints. One or more affine transformations may be selected which best brings the feature points of the frame as close to the midpoints as possible.

In some embodiments, the midpoints may be calculated iteratively using a moving window that encompasses a pre-determined number of frames, resulting in multiple midpoints calculated from multiple different selected feature points. After a plurality of iterations, the frames may be aligned along a common path or series of related vectors to provide a smooth 360 degree animation.

A determination may be made as to whether all feature points, or all images, have been processed, at 720. For example, this may include determining whether each frame has been adjusted so that the frame's feature points align with calculated midpoints between surrounding non-consecutive frames. In some embodiments, the method 700 may include processing each image multiple times, in order to align images one by one and create smooth "tracks" or paths of the feature points through successive frames.

If all feature points or images have not been processed, at 720, the method 700 may include iterating to a next image or set of images, at 722, and selecting a next set of non-consecutive images, at 714. If all feature points or images have been processed, at 720, the method may include performing final image adjustments, at 724. For example, final image adjustments may include performing image cropping, scaling, or other editing. Performing final image adjustments may also include combining the individual images or frames together into an animated file. Other embodiments are also possible.

In some embodiments, the animation that may be presented in a graphical user interface may be an aggregation of multiple images aligned according to the processes and methods described above. In some embodiments, the images may be linked in an ordered sequence so that the images may be readily rendered as a 360 degree image. Further, within some embodiments, the animation or combined image may be accessed by a user via a touchscreen or other interface to rotate the animation or combined image and to zoom into particular points. The actual image corresponding to the zoomed in portion of the subject or object may be presented in order to provide a high resolution image for display.

In some embodiments, in addition to aligning selected feature points within images of a sequence to a midpoint or vector to provide the smooth transition from image to image in the sequence, the feature point management module may be configured to interpolate or combine images to correct flaws and to fill in missing information in order to smooth the transition during rotations. Other embodiments and other image processing may also be possible.

Figure 8:
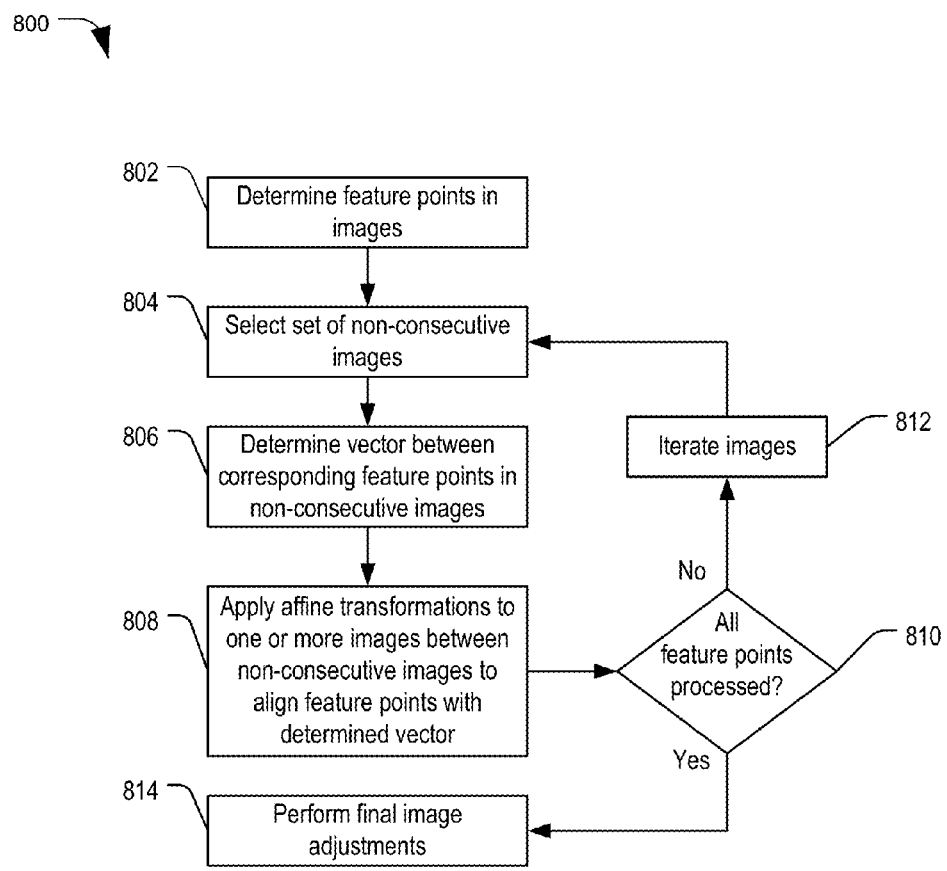
FIG. 8 depicts a flowchart of a method of surround image capture and processing, in accordance with certain embodiments of the present disclosure.

FIG. 8 is a flowchart of a method 800 of surround image capture and processing, in accordance with certain embodiments of the present disclosure. The method 800 may include example embodiments of the step "process images" 612 of method 600. In some embodiments, the method 800 may be performed after or in conjunction with elements 702 through 710 of FIG. 7. In some embodiments, the method 800 may be performed in lieu of elements 716 and 718 of FIG. 7. The method 800 may be performed by the processor 204 of FIG. 2, for example, using preprocessing module 218, feature point management module 220, and image transformation module 222.

At 802, the method 800 may include determining feature points in the collected images. Determining the feature points may be performed as described in relation to 712 of FIG. 7 and elsewhere herein. The method 800 may include selecting a set of non-consecutive images, at 804. For example, the method 800 may include selecting image frames 1 and 3, or two or more sets of consecutive images, which are not consecutive to each other (e.g., frames 1-3 and 7-9). In some embodiments, the method 800 may select a window of images, such as from image n to image n+p (where n is an integer and p is a number of images in the "window"). The window may represent a rolling or sliding window, within which non-consecutive images may be selected.

At 806, the method 800 may include determining vectors between corresponding feature points in the selected non-consecutive images. A vector may represent a straight line connecting the feature in one image to the same feature in another image. For example, the method 800 may include calculating a vector (e.g. a straight line) between feature point A in frame 1 and feature point A corresponding to the same image feature in frame 3. The vector may be calculated or stored as a start point and an end point (e.g. using X and Y coordinates), as a set of pixel positions or X and Y coordinates between the end points of the vector (e.g. representing every point or a set of points between the end points), as an equation, or in another format.

The method 800 may include applying one or more affine transformations to one or more selected images between the non-consecutive images, in order to align feature points in the selected images with the calculated vectors. For example, the method 800 may include calculating a vector between point A in frame 1 and point A in frame 5, and then performing affine transformations on frame 3 to align point A from frame 3 with a nearest point along the calculated vector. In some embodiments, a frame may include multiple feature points, and not all feature points can be aligned exactly to the corresponding calculated vector. One or more affine transformations may be selected which best brings the feature points of the frame as close to the vectors as possible.

In some embodiments, the vector may be calculated iteratively using a moving window that encompasses a pre-determined number of frames, resulting in multiple vectors calculated from multiple different selected feature points. After a plurality of iterations, the frames may be aligned along a common vector or series of related vectors to provide a smooth 360 degree animation. In an example, after aligning features in frames 1-50 to one or more selected vectors, the window may shift and new vectors between features in frames 2-51 may be calculated. The method 800 may include iteratively processing each of the images and multiple vectors to align multiple images along multiple vectors in order to produce a smooth transition from one image to the next in a sequence of images.

A determination may be made as to whether all feature points, or all images, have been processed, at 810. For example, this may include determining whether each frame has been adjusted so that the frame's feature points align with calculated vectors between surrounding non-consecutive frames. In some embodiments, the method 800 may include processing each image multiple times, in order to align images one by one and create smooth "tracks" or paths of the feature points through successive frames.

If all feature points or images have not been processed, at 810, the method 800 may include iterating to a next image or set of images, at 812, and selecting a next set of non-consecutive images, at 804. If all feature points or images have been processed, at 810, the method may include performing final image adjustments, at 814. Final image adjustments may correspond to those described in relation to FIG. 7 and elsewhere herein. In a particular example, final image adjustments may include discarding discontinuities, resolving end points, and so on. In some embodiments, the method 800 may include providing an alert to a user that there is insufficient data (or a data error) preventing completion of the 360 degree animation and instructing the user to attempt to capture the images a second time. Other embodiments are also possible.

Figure 9:
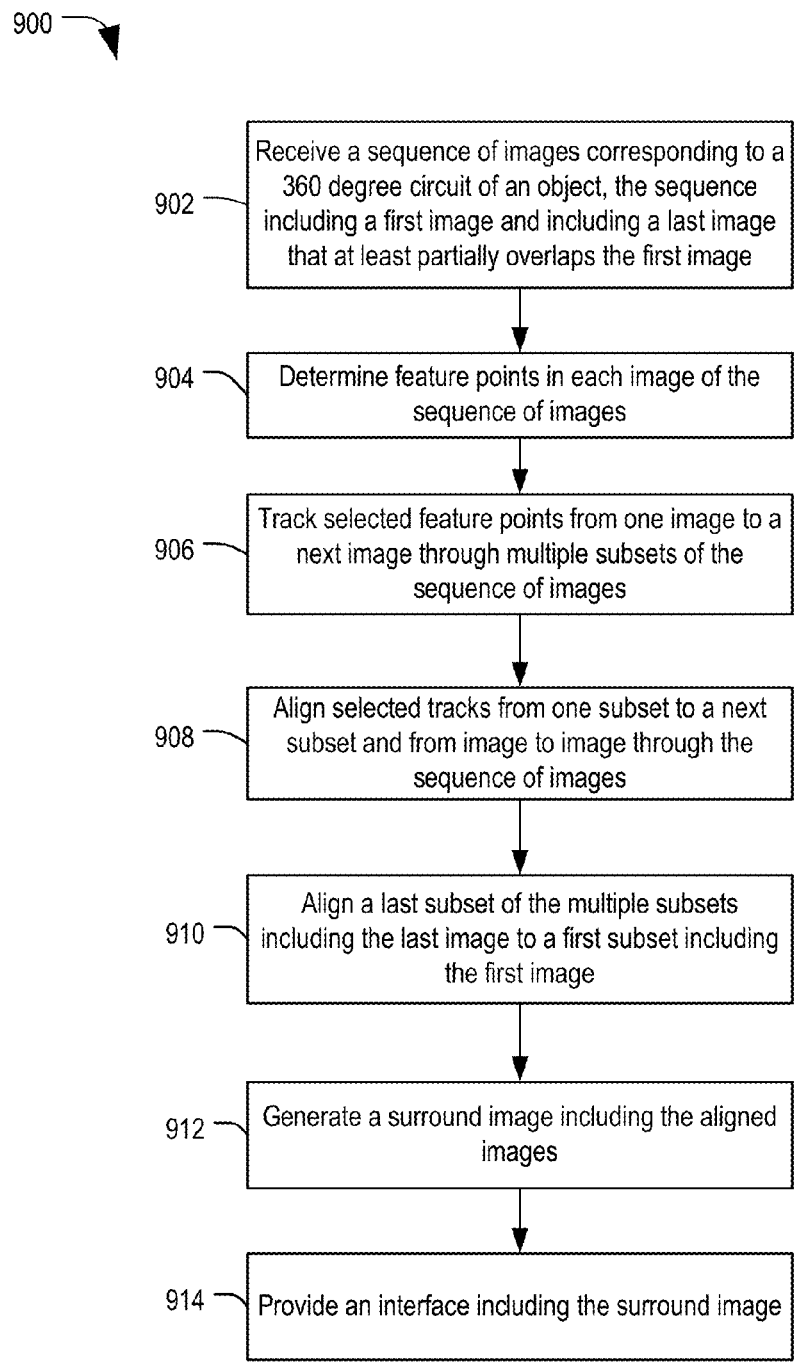
FIG. 9 depicts a flowchart of a method of surround image capture and processing in accordance with certain embodiments of the present disclosure.

FIG. 9 is a flowchart of a method 900 of surround image capture and processing in accordance with certain embodiments of the present disclosure. At 902, the method 900 may include receiving a sequence of images corresponding to a 360 degree circuit of an object, where the sequence includes a first image and a last image that at least partially overlaps the first image. In certain embodiments, the image content of the last image may overlap image content of the first image. In certain embodiments, the system may include an application that, when executed, causes a computing device to capture the sequence of images. In some embodiments, the application may include an interface configured to direct the user to perform particular actions. Additionally, in some embodiments, the application may overlay a transparent version of the first frame on the object to assist the user in aligning the computing device to capture a last frame that is substantially overlapping the first image. In certain embodiments, the application may alert the user when the last image is dissimilar from the first image and may require adjustment. After capture, the method may include preprocessing the sequence of images to resize, alter, shift, warp or otherwise prepare the images for further processing.

At 904, the method 900 may further include determining feature points in each image of the sequence of images. In some embodiments, the system may determine feature points in selected images of the sequence, and may discard one or more images, such as images determined to be too blurry, images that have no discernable feature points, duplicative images, or any combination thereof. In some embodiments, the system may determine feature points based on pixel intensity gradients within a greyscale version of each selected image (as discussed above).

At 906, the method 900 may include tracking selected feature points from one image to a next image through multiple subsets of the sequence of images. In an example, the method may include tracking a selected feature point from a first selected frame through a subset of frames (e.g., five frames). The tracking of each selected feature point produces a track that extends from the first selected frame through at least one other frame of the subset. By tracking multiple feature points, multiple tracks can be determined.

At 908, the method 900 can include aligning selected tracks from one subset to a next subset and from image to image through the sequence of images. In some embodiments, a greedy algorithm-type approach may be used to align tracks that start within some distance threshold of a corresponding track from a previous frame. Overlapping track portions may be grouped or linked and the track may be extended by the overlapping portion to form a single continuous track that can extend beyond the subset.

At 910, the method 900 may further include aligning a last subset of the multiple subsets including the last image to a first subset including the first image. In some embodiments, the method may include aligning the first and last image as if the first image followed after the last image in the image capture sequence. If the alignment is sufficient, this track-based alignment may be sufficient to smoothly stitch the last frame to the first frame. In some embodiments, the last frame may be insufficiently aligned to allow for a smooth transition. In some embodiments, the method 900 may include creating a database of descriptors for the feature points found in the first few images and the last few images of the sequence based on their appearance or based on the pixel intensity gradients. If feature points in the different frames have similar descriptors (e.g., a vector of 128 numbers describing the pixel neighborhood around that feature point), then they can be matched and their tracks can be chained together. In certain embodiments, the descriptions of the pixel neighborhoods may be used for long-range matching. If the loop closure (i.e., alignment of the first and last images) does not succeed, the method 900 may include automatically (or manually) loosening constraints between the first and last frames to allow for a shift from the last image to the first image (and vice versa).

At 912, the method 900 may include generating a surround image including the aligned images. In some embodiments, the first and last images may be loosely aligned and may be included in the surround image such as by loosening the constraints to allow them to be linked though a visible shift may be present as the surround image is manipulated to transition between the first and last frames.

At 914, the method 900 may include providing an interface including the surround image. In some embodiments, the surround image may be hosted by a server and may be provided within an Internet web page. In certain embodiments, the surround image may be presented within an application interface of a program executing on a computing device, such as a smart phone. In certain embodiments, the interface may be accessible by a user to manipulate the surround image, such as by dragging a finger over the surround image to rotate the surround image within the interface.

In certain embodiments, when the endpoints are aligned from the first frame through the last frame, the interface may be accessed to smoothly rotate the surround image. In some embodiments, when the end points are not well-aligned, the interface may still be accessed to rotate the surround image, but the transition between the first frame and the last frame may include a visible shift or adjustment. Other embodiments are also possible.

Figure 10:
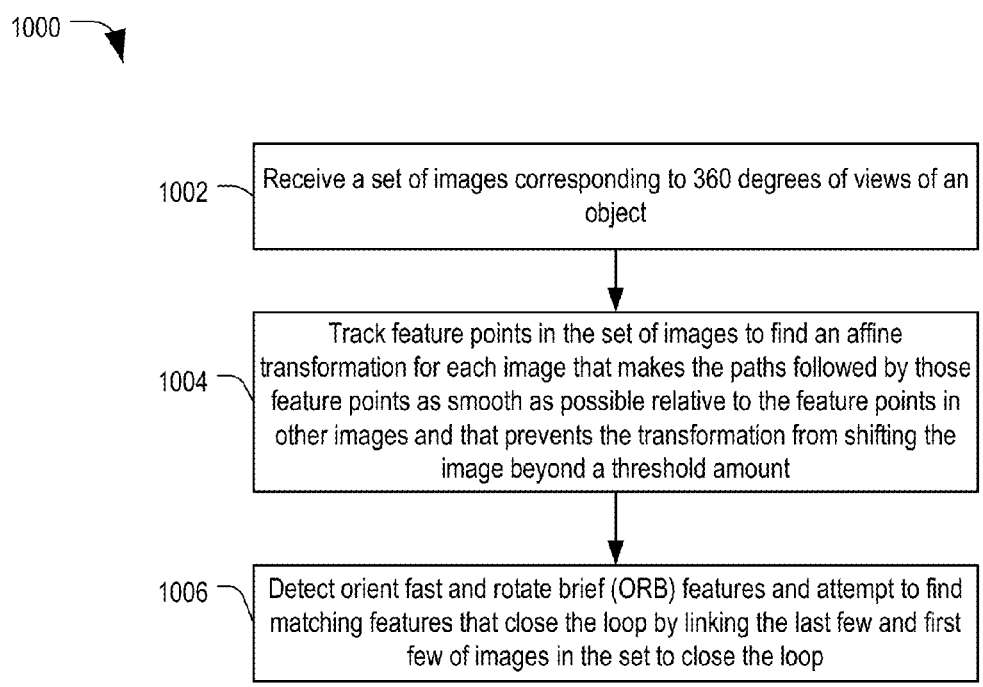
FIG. 10 depicts a flowchart of a method of surround image capture, in accordance with certain embodiments of the present disclosure.

FIG. 10 is a flowchart of a method 1000 of surround image capture, in accordance with certain embodiments of the present disclosure. The method 1000 may include receiving a set of images corresponding to 360 degrees of views of an object, at 1002. In certain embodiments, the set of images may be captured by a device, such as a smart phone or other computing device, which also may subsequently process the images. The method 1000 may further include tracking feature points in the set of images to find an affine transformation for each image that makes the paths followed by those feature points as smooth as possible relative to the feature points in other images and that prevents the transformation from shifting the image beyond a threshold amount, at 1004. In certain embodiments, the feature points may be tracked by a processing circuit of the device.

In certain embodiments, the processing circuit of the device may track feature points in the set of images captured by walking 360 degrees around an object. For the set of images, the processing circuit of the device may be configured to determine the affine transformation to apply to each image, which transformation makes the paths followed by those feature points from frame-to-frame as smooth as possible. Further, the processing circuit of the device may constrain the affine transform to limit shifting of the image from its original location such that the shifted image is not shifted outside of the field of view, with much of the image no longer visible to a human viewing the transformed image.

In certain embodiments, for each image, the processing circuit of the device may automatically identify a number of parameters (such as 2 or 4 affine parameters) to describe the affine transform for each image. When solving for four parameters in each image, the processing circuit of the device may simultaneously estimate a two-dimensional (2D) translation, rotation, and scaling. When solving for just two parameters in each image, the processing circuit of the device may only estimate the 2D translation, while keeping the scale fixed and while setting the each image's rotation according to signals from a gyro-sensor on the device.

To estimate these affine parameters, the processing circuit of the device may be configured to solve a system of linear equations of the form Ax=b. The vector x may correspond to the identified 2 or 4 affine parameters per image, so that every row of the A matrix represents a single linear equation in the unknown affine parameters. In certain embodiments, the A matrix may be a very large sparse matrix, mostly consisting of zeros. Each pair of rows represents a single constraint on the x and y position of a point. Each column represents a single affine parameter for a single image. So for a sequence of n images, with 4 affine parameters per image, the A matrix includes 4*n columns. The number of rows is a function of the number of point-based constraints, as well as direct one-frame constraints on the parameter values.

The constraints imposed by the A matrix may include a frame translation constraint, a frame constant position constraint, a frame constant velocity constraint, and a frame constant acceleration constraint. When four affine parameters are involved, the constraints may also include a frame scale and rotation constraint.

In certain embodiments, the frame translation constraint may express the notion that the x- and y-translational components of the affine transform for a given frame should both equal zero, keeping the frame close to its original position. In certain embodiments, the frame constant position constraint may express the notion that, for a feature point tracked across two frames, the transformed point in a first frame may lie at approximately the same position as the transformed point in a second frame.

In certain embodiments, the frame constant velocity constraint may express the notion that, for a feature point tracked across three frames, the transformed point in the second frame should lie at the mid-point of the transformed point in the first frame and the transformed point in the third frame. In certain embodiments, the frame constant acceleration constraint may express the notion that, for a feature point tracked across four frames, the distance between transformed point in the second and third frames should be approximately equal to the average of the distance between the transformed point in the first and second frames, and the average of the distance between the transformed point in the third and fourth frames.

Each of the above-constraints may be represented by two rows in the A matrix, one corresponding to the constraint in the x-dimension, the other corresponding to the same constraint in the y-dimension. The processing circuit of the device may apply the two-frame, three-frame, and four-frame constraints at multiple time-scales. For example, instead of these constraints only being applicable to feature points tracked across two, three, or four consecutive frames, for a time-scale of dt frames, the processing circuit of the device may determine any tracks of length 2*dt, 3*dt, or 4*dt and apply the same constraints across equally spaced frames at larger time scales (course constraint application). For example, for dt=8, we may constrain a feature point to have constant velocity across frames 1, 9, and 17 of a sequence.

When estimating the four parameters of an affine transform, the processing circuit of the device may apply the frame scale and rotation constraint, which expresses the notion that the combined rotation and scale components of the affine transform (a and b) for a given frame should remain at fixed values, usually one and zero.

In certain embodiments, each of the above-constraints may be given a different weight to emphasize the relative importance of satisfying each constraint. When solving the linear system Ax=b, the processing circuit of the device may not be able to solve all the constraints exactly, since, for example, the constraint to keep an image at its original position may conflict with the point smoothness constraints. Therefore, the processing circuit of the device may use a linear least squares approach to best satisfy all the equations while minimizing the residual squared error. To do this, the processing circuit of the device may compute the QR factorization of the A matrix (where Q is an orthogonal matrix and R is an upper triangular matrix). The processing circuit of the device may then perform a back substitution to solve for x.

At this point, the processing circuit of the device may have smoothed the sequence of images from the first image to the last image. However, to present a 360 degree view, the processing circuit of the device may close the loop. The method 1000 may include detecting orient fast and rotate brief (ORB) features and may attempt to find matching features that close the loop by linking the last few and first few of the images in the set to close the loop, at 1006.

In certain embodiments, in a sequence of N frames, the processing circuit of the device may detect ORB features in the N−2, N−1, 1st, and 2nd frames of the sequence and may attempt to identify matching features that "close the loop" by linking the last and first sets of images in the sequence. When such features are identified, the processing circuit of the device may introduce two-frame and three-frame constraints between the last and first images in the sequence to ensure smoothness despite the fact that the first and last frames may not be well aligned, initially. In certain embodiments, the processing circuit of the device may also apply a strong one-frame translation constraint to the first image in the sequence in order to anchor the whole sequence. In the absence of a detected loop closure, the processing circuit of the device may apply a strong one-frame translation constraint to the last image in the sequence as well, so that both ends of the chain of points are anchored.

In some embodiments, the tracking of such feature points may fail. In an example, when the processing circuit of the device encounters a frame through which points were not successfully tracked, the processing circuit of the device may be unable to enforce multi-frame smoothness constraints. Accordingly, the processing circuit of the device may instead enforce a strong one-frame translation constraint for that frame, as well as for the immediately following frame. The processing circuit of the device may then enforce a two-frame constant position constraint linking the first frame after a tracking failure to a next frame (e.g., the second frame after the tracking failure). In certain embodiments, in the general case of successful tracking through a frame, the processing circuit of the device may enforce three-frame constant velocity constraints on some or all of the tracked points in the selected frame.

In certain embodiments, one or more tracks from a frame (at a given time scale) may be erroneous. In certain embodiments, the processing circuit of the device may identify selected tracks in a frame and may only enforce constraints for those proven tracks. In certain embodiments, the processing circuit of the device may use a random sample consensus (RANSAC) algorithm. In an example, the processing circuit of the device may randomly choose two tracks from the set of all tracks in a frame, ensuring that each track is of length at least 3 frames, and the processing circuit of the device may compute a midpoint the first frame and the third frame positions for both tracks. The processing circuit of the device may then compute the affine transform that maps the second frame positions onto those mid-point positions. In certain embodiments, the processing circuit of the device may then find remaining potential tracks for which this same affine transform maps the second frame positions onto the first frame to third frame midpoints. In certain embodiment, the processing circuit of the device may iterate this process with different random samples, and may select the affine transform with the largest set of inliers, and use only those inliers to enforce the smoothness constraints across the frames. Other embodiments are also possible.

In a particular example, using RANSAC, the processing circuit of the device may process random samples and achieve acceptable smoothing. In an example, if there are 100 points and the system is configured to choose two, there are 4,950 possible combinations (100 choose 2). Using RANSAC, the processing circuit of the device may select just 200 samples and achieve acceptable smoothing twenty-five times faster than if the 4,950 possible combinations were processed. If the frame has fewer possible points, then the processing circuit of the device may selectively process the points either using the RANSAC algorithm or processing all of the possible combinations.

In the above-discussion, the affine algorithm may use two or four affine parameters. In certain embodiments, the parameters may be unknown values that define the affine transformation, and which the processing circuit of the device may be trying to estimate for each image. In general, the choice of two affine parameters or four affine parameters may be pre-configured (selected by an operator or automatically determined from the selected image). The choice may be understood to describe two flavors of the same algorithm (translation-only for 2 affine parameters, or translation-rotation-scale for 4 affine parameters).

In certain embodiments, the processing circuit of the device may use the two-parameter constraints (translation only) for the first 97% of the images in the sequence and, if a loop-closure is detected (the processing circuit has a full 360-degree sequence and features have been matched between the last few and first few images in the sequence) then the four-parameter constraints (translation plus rotation and scale) may be used for the final 3% of the images so that the final images can seamlessly line up with the initial images despite a significant jump in scale between the last image and the first image, meaning that at the end of the capture the user has completed a full circle but is now standing closer or farther to the imaged object than he or she was when the image capture process started.

In general, the two-parameter version may be faster because the processing circuit is solving a simpler problem (estimate only the x- and y-translation of each image, and assume that the gyro-sensor provides a good value for rotation). The four-parameter version may lead to slower computations and more memory requirements, but allows for estimating changes in rotation and scale for each image. Scale estimation may become important during loop closure.

Figure 11A:
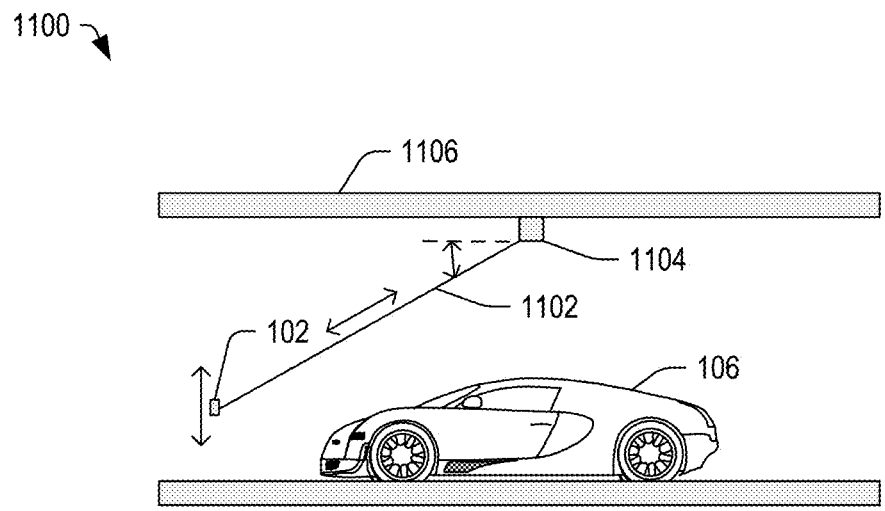
FIGS. 11A and 11B depict diagrams of a movable system configured to secure and move the camera device in a circular path about an object to be photographed, in accordance with certain embodiments of the present disclosure.
Figure 11B:
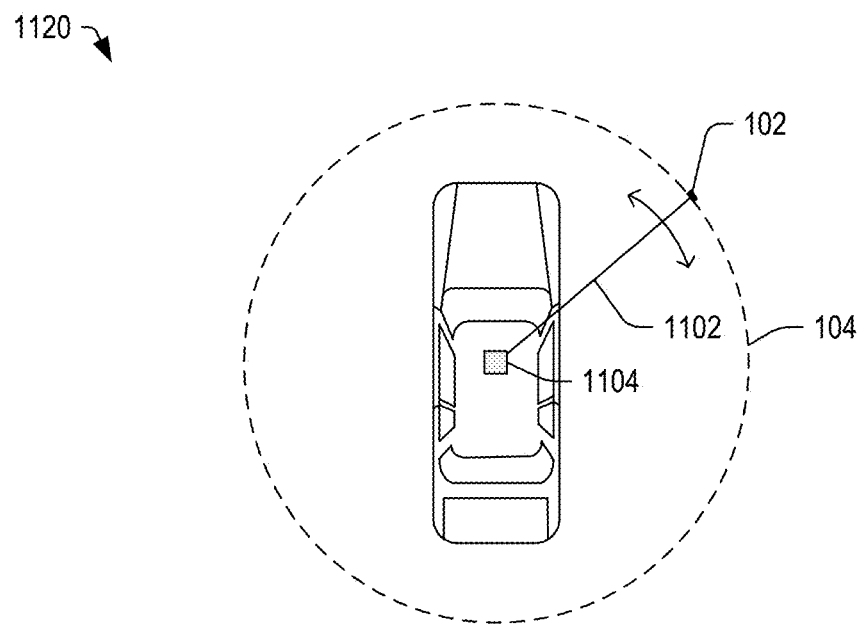

FIGS. 11A and 11B depict diagrams of a movable system configured to secure and move the camera device in a circular path about an object to be photographed, in accordance with certain embodiments of the present disclosure. In FIG. 11A, a system 1100 is shown that includes an object 106 to be photographed. The camera device 102 may be coupled to an arm 1102, which may extend from a rotatable element 1104 coupled to a ceiling 1106 above the object. The arm 1102 may be rotated about the rotatable element 1104 to move the camera device 102 along a circular path 104 around the object 106, as depicted in FIG. 11B.

In certain embodiments, an object 106 may be approximately centered beneath the rotatable element 1104, and a camera device 102 may be mounted to the arm 1102. In some embodiments, the rotatable element 1104 may include an actuator, such as a motor, that may be controlled to move the arm 1102 about a center axis in a 360 degree path 104 about the object 106 in order capture images using the camera device 102. Subsequently, the images may be stitched together as discussed above with respect to FIGS. 1-10 in order to produce a surround image of the object 106.

In conjunction with the systems, methods, and devices described above with respect to FIGS. 1-11B, a plurality of images of an object may be captured as a camera device is moved along a substantially circular path about the object. After the images are captured, the images may be aligned, oriented, or otherwise processed to produce a surround image by aligning selected feature points across multiple image frames. In some embodiments, one or more affine transformations may be used to perform the alignment process. Further, feature points in the beginning image and the ending image may be aligned to complete the surround image. In certain embodiments, the resulting surround image may be interactive, allowing a user to rotate the image about an axis, and the rotating image may appear smooth (without discontinuities).

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, in the flow diagrams presented herein, in certain embodiments blocks may be removed, combined, or rearranged without departing from the scope of the disclosure. For example, the decision whether to discard images from a set of images at 704 of FIG. 7 may be performed after determining feature points in the images, at 712.

Further, in certain embodiments structural and functional elements within the diagrams may be combined, separated, or removed, without departing from the scope of the disclosure. Additionally, certain modules and components may be combined, or split into sub-components. In an example embodiment, sensor module 226 and image capture module 216 of FIG. 2 may be combined into a single module. In the various embodiments, functionality assigned to a particular component or module may be handled by another component instead or various functions may be combined into a single module or application. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
    a positional sensor to determine positional data corresponding to the apparatus relative to an object;
    a camera element to capture image data associated with the object; and
    a memory configured to store the image data and instructions;
    a processor circuit coupled to the memory, the positional sensor, and the camera element, the processor circuit configured to direct the camera element to capture the image data based on the positional data, the image data including a sequence of images, the processor circuit further configured to:
        automatically determine one or more feature points in selected images of the sequence of images;
        selectively align the one or more feature points across multiple subsets of the selected images of the sequence of images automatically to produce aligned images;
        selectively align one or more feature points of a first selected image to corresponding feature points of a last selected image of the sequence of images, automatically, to produce a surround image; and
        store the surround image in the memory.

2. The apparatus of claim 1, wherein the processor circuit is further configured to:
    determine a position along a closed-loop path based on the positional data; and
    direct the camera element to capture the image data at angular intervals along the closed-loop path based on the positional data.

3. The apparatus of claim 1 wherein the processor circuit is further configured to:
    determine a position along a closed-loop path based on the positional data; and
    direct the camera element to capture the image data at linear distance intervals along the closed-loop path based on the positional data.

4. The apparatus of claim 1, wherein the processor circuit is further configured to:
    determine a position along a closed-loop path based on the positional data; and
    direct the camera element to capture the image data at periodic intervals along the closed-loop path based on the positional data.

5. The apparatus of claim 1, wherein-the processor circuit is further configured to:
    determine selected feature points in selected images of the sequence of images;
    calculate a midpoint between the location of the selected feature points in non-consecutive images from the sequence of images; and
    perform an image transformation operation on an intervening image from the sequence of images to align the selected feature point of the intervening image with the midpoint.

6. The apparatus of claim 1, wherein the processor circuit is further configured to:
    determine selected feature points in selected images of the sequence of images;
    calculate a vector connecting the selected feature points in non-consecutive images from the sequence of images; and
    perform an image transformation operation on an intervening image from the sequence of images to align the selected feature point of the intervening image with the vector.

7. The apparatus of claim 1, wherein the processor circuit is further configured to generate an animation including a surround image based on processed images from the sequence of images, the animation configured to present the processed images in a sequence to allow continuous rotation without a discontinuity at a starting or ending image of the sequence.

8. The apparatus of claim 1, wherein the processor circuit is further configured to iterate through selected images of the sequence of images to perform image transformation operations to align the selected images to a vector determined from selected feature points within each of the selected images to produce a smooth transition from image to image in the sequence.

9. A processor-readable device embodying instructions that, when executed, cause a processor to:
    receive a sequence of images;
    automatically determine one or more feature points in selected images of the sequence of images;
    automatically track the one or more feature points across selected subsets of the sequence of images to determine one or more tracks extending from a first image to a last image of each subset;
    selectively align the one or more feature points across multiple subsets of the selected images of the sequence of images automatically using the one or more tracks to produce aligned images;
    selectively align one or more feature points of a first selected image to corresponding feature points of a last selected image of the sequence of images, automatically, to produce a surround image; and
    store the surround image in a memory.

10. The processor-readable device of claim 9, wherein the instructions that, when executed, cause the processor to selectively align the one or more feature points across the multiple subsets include instructions that cause the processor to:
    selectively align a feature point of an intermediate image, automatically, to a midpoint between a first selected image and a second selected image in one of the multiple subsets of the selected images of the sequence of images.

11. The processor-readable device of claim 9, wherein the instructions that, when executed, cause the processor to selectively align the one or more feature points across the multiple subsets include instructions that cause the processor to:
    automatically determine first feature points in a first selected image of one of the multiple subsets;

automatically determine second feature points in a second selected image in the one of the subsets;

automatically determine a vector extending between the first feature points and the second feature points; and selectively align feature points of an intermediate image of the one of the multiple subsets to the vector, automatically.

12. The processor-readable device of claim 11, wherein the instructions further cause the processor to:

iteratively select a next subset, automatically;

automatically determine first feature points and second feature points in the next subset;

automatically determine a next vector extending between the first feature points and the second feature points;

selectively align feature points of an intermediate image of the next subset of the multiple subsets to the next vector, automatically; and repeat the selectively align step automatically through selected images of the next subset to produce the surround image.

13. The processor-readable device of claim 9, wherein the instructions to determine one or more feature points in selected images of a sequence of images further cause the processor to:

automatically identify pixels within one or more of the selected images based on a contrast between the identified pixels and adjacent pixels; and automatically select the identified pixels as feature points.

14. A method of producing a surround image, the method comprising:

receiving a sequence of images at a processor of a computing device;

automatically identifying, by the processor, one or more feature points in selected images of the sequence of images using the processor;

automatically tracking, by the processor, the one or more feature points across subsets of the selected images to determine a track extending between first and last images of each subset;

automatically aligning, by the processor, at least one intermediate image within each subset to the track;

automatically aligning, by the processor, feature points of first and last images of the sequence of images to produce a surround image; and storing the surround image in a memory.

15. The method of claim 14, wherein before automatically identifying, the method further comprising:

sensing positional data via one or more sensors coupled to the processor;

automatically determining, by the processor, a position along a closed-loop path based on the positional data; and automatically directing a camera element by the processor to capture the image data at angular intervals along the closed-loop path based on the positional data.

16. The method of claim 14, wherein automatically identifying the one or more feature points comprises:

automatically determining, by the processor, one or more pixels within a selected image of the sequence of images, the determined one or more pixels having a high contrast relative to adjacent pixels;

automatically selecting, by the processor, a next image of the sequence of images; and repeating the determining of the one or more pixels with each selected image.

17. The method of claim 14, wherein automatically tracking the one or more feature points comprises:

automatically determining, by the processor, one or more vectors extending between first feature points of a first image and second feature points of a second image of the sequence of images; and selectively aligning feature points of one or more intermediate images between the first image and the second image to the one or more vectors using the processor.

18. The method of claim 14, further comprising automatically selecting by the processor, a subset of the sequence of images, the subset including a first image, a last image and at least one intermediate image.

19. The method of claim 18, further comprising automatically determining, by the processor, first feature points in the first image;

automatically determining, by the processor, second feature points in the second image;

automatically determining, by the processor, a vector extending between the first feature points and the second feature points; and selectively aligning, by the processor, feature points of the at least one intermediate image to the vector.

20. The method of claim 18, further comprising automatically determining, by the processor, first feature points in the first image;

automatically determining, by the processor, second feature points in the second image;

automatically determining, by the processor, a midpoint between the first feature points and the second feature points; and selectively aligning, by the processor, feature points of the at least one intermediate image to the midpoint.

21. The processor-readable device of claim 9, further embodying instructions that, when executed, cause a processor to:

determine positional data based on signals received from a positional sensor, the positional data corresponding to a position of a camera element relative to an object; and direct the camera element to capture the image data based on the positional data, the image data including a sequence of images.

\* \* \* \* \*